US011953846B2

(12) United States Patent
Taniguchi

(10) Patent No.: US 11,953,846 B2
(45) Date of Patent: Apr. 9, 2024

(54) IMAGE FORMING APPARATUS

(71) Applicant: CANON KABUSHIKI KAISHA, Tokyo (JP)

(72) Inventor: Koichi Taniguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/870,167

(22) Filed: Jul. 21, 2022

(65) Prior Publication Data

US 2022/0357688 A1 Nov. 10, 2022

Related U.S. Application Data

(63) Continuation of application No. PCT/JP2021/002702, filed on Jan. 20, 2021.

(30) Foreign Application Priority Data

Jan. 22, 2020 (JP) ................................ 2020-008790

(51) Int. Cl.
*G03G 15/01* (2006.01)
*G03G 15/16* (2006.01)

(52) U.S. Cl.
CPC ................................ *G03G 15/1615* (2013.01)

(58) Field of Classification Search
USPC ................................................. 399/302, 308
See application file for complete search history.

(56) References Cited

U.S. PATENT DOCUMENTS 9,116,471 B2 * 8/2015 Inuzuka ............. G03G 15/1615
9,304,472 B2 * 4/2016 Ishikawa .............. G03G 15/167
9,766,574 B2 * 9/2017 Omata ............... G03G 15/1615
9,989,895 B2 * 6/2018 Inuzuka ............. G03G 15/1615
11,029,626 B2 6/2021 Torimaru et al.
2008/0080907 A1 4/2008 Pargett et al.

FOREIGN PATENT DOCUMENTS

JP 2013-101300 A 5/2013
JP 2013-238769 A 11/2013
JP 2014-134718 A 7/2014
JP 2015-219275 A 12/2015
(Continued)

OTHER PUBLICATIONS

International Search Report and Written Opinion dated Mar. 9, 2021, in International Application No. PCT/JP2021/002702.
(Continued)

Primary Examiner — Hoan H Tran
(74) Attorney, Agent, or Firm — Venable LLP

(57) ABSTRACT

An image forming apparatus, employs a constitution in which, in a case that a relative position between an inner roller and an outer member with respect to a circumferential direction of the inner roller is changed in a period after a preceding recording material passed through a transfer portion and until a recording material subsequent to the preceding recording material reaches the transfer portion during execution of a job for forming and outputting images on a plurality of recording materials, a controller controls a position changing mechanism so that the relative position between the inner roller and the outer member is changed in a state in which the outer member contacts an intermediary transfer belt.

17 Claims, 12 Drawing Sheets

(56) References Cited

FOREIGN PATENT DOCUMENTS

| | | | |
|---|---|---|---|
| JP | 2016-057514 | A | 4/2016 |
| JP | 2017-062420 | A | 3/2017 |
| JP | 2019-120830 | A | 7/2019 |
| JP | 2019-200283 | A | 11/2019 |

OTHER PUBLICATIONS

U.S. Appl. No. 17/870,181, filed Jul. 21, 2022, Koichi Taniguchi.
U.S. Appl. No. 17/870,193, filed Jul. 21, 2022, Koichi Taniguchi.
Office Action dated Sep. 26, 2023, in Japanese Patent Application No. 2020-008790.
Office Action dated Feb. 6, 2024, in Japanese Patent Application No. 2020-008790.

* cited by examiner

IMAGE FORMING APPARATUS

TECHNICAL FIELD

The present invention relates to an image forming apparatus, such as a copying machine, a printer or a facsimile machine, of an electrophotographic type or an electrostatic recording type.

BACKGROUND ART

Conventionally, as the image forming apparatus of the electrophotographic type, there is an image forming apparatus using an endless belt (hereinafter, also simply referred to as a "belt") as an image bearing member for bearing a toner image. As such a belt, for example, there is an intermediary transfer belt used as a second image bearing member for feeding the toner image primary-transferred from a photosensitive member or the like as a first image bearing member, in order to secondary-transfer the toner image onto a sheet-like recording material such as paper. In the following, principally, an image forming apparatus of an intermediary transfer type including an intermediary transfer belt will be described as an example.

In the image forming apparatus of the intermediary transfer type, a toner image formed on the photosensitive member or the like in an image forming portion is primary-transferred onto the intermediary transfer belt in a primary transfer portion. Further, the toner image primary-transferred on the intermediary transfer belt is secondary-transferred onto the recording material in a secondary transfer portion. By an inner member (inner secondary transfer member) provided on an inner peripheral surface side of a secondary transfer belt and an outer member (outer secondary transfer member) provided on an outer peripheral surface side of the secondary transfer belt, a secondary transfer nip as the secondary transfer portion which is a contact portion between the intermediary transfer belt and the outer member is formed. As the inner member, an inner roller which is one of a plurality of stretching rollers for stretching the intermediary transfer belt is used. As the outer member, an outer roller which is provided in a position opposing the inner roller while nipping the intermediary transfer belt between itself and the inner roller is used in many instances. Then, for example, a secondary transfer voltage of a polarity opposite to a charge polarity of toner is applied to the outer roller, so that the toner image on the intermediary transfer belt is secondary-transferred onto the recording material in the secondary transfer nip. In general, with respect to a feeding direction of the recording material, on a side upstream of the secondary transfer nip, a feeding guide for guiding the recording material to the secondary transfer nip is provided.

Here, depending on a shape of the secondary transfer nip, behavior of the recording material changes in the neighborhoods of the secondary transfer nip on sides upstream and downstream of the secondary transfer nip with respect to the recording material feeding direction. Further, in recent years, although it is required to meet various recording materials different in rigidity depending on a thickness or a surface property, depending on the rigidity of the recording material, the behavior of the recording material also changes in the neighborhoods of the secondary transfer nip on the sides upstream and downstream of the secondary transfer nip with respect to the recording material feeding direction. For example, in the case where the recording material is "thin paper" which is an example of the recording material with small rigidity, in the neighborhood of the secondary transfer nip on the side downstream of the secondary transfer nip with respect to the recording material feeding direction, the intermediary transfer belt and the recording material stick to each other, so that a jam (paper jam) occurs in some instances due to improper separation of the recording material from the intermediary transfer belt. This phenomenon becomes conspicuous in the case where the rigidity of the recording material is small because the recording material is liable to stick to the intermediary transfer belt due to weak stiffness of the recording material.

On the other hand, for example, in the case where the recording material is "thick paper" which is an example of the recording material with large rigidity, when a trailing end of the recording material with respect to the recording material feeding direction passes through the feeding guide, a tailing end portion of the recording material with respect to the recording material feeding direction collides with the intermediary transfer belt in some instances. Then, with respect to the recording material feeding direction, an attitude of the intermediary transfer belt in the neighborhood of the secondary transfer nip on the upstream side is disturbed, so that an image defect (a stripe-shaped image disturbance or the like extending in a direction substantially perpendicular to the recording material feeding direction) occurs in some instances. This phenomenon becomes conspicuous in the case where the rigidity of the recording material is large because the trailing end portion of the recording material with respect to the recording material feeding direction is liable to powerfully collide with the intermediary transfer belt due to strong stiffness of the recording material.

In order to solve such problems, a constitution in which a width of the secondary transfer nip with respect to a rotational direction of the intermediary transfer belt is changed depending on a kind of the recording material has been proposed (Japanese Laid-Open Patent Application 2014-134718).

As described above, in order to realize improvement in separating property of the recording material from the intermediary transfer belt and suppression of the image defect due to collision of the trailing end portion of the recording material with respect to the recording material feeding direction, with the intermediary transfer belt, it is effective that the width of the secondary transfer nip (position of the secondary transfer nip) with respect to the rotational direction of the intermediary transfer belt is changed depending on the kind of the recording material. This change in width of the secondary transfer nip can be made by changing a relative position between the inner roller and the outer roller with respect to a circumferential direction of the inner roller through movement of the inner roller or the outer roller in a direction crossing a pressing direction in the secondary transfer nip, thus changing the position of the secondary transfer nip.

Here, in the image forming apparatus of an electrophotographic type or the like, for example, for bookbinding printing, a job for forming images on recording materials of a plurality of kinds (herein, called a "mixed job") is executed in some instances. In the mixed job, in order to obtain a good transfer property for each of the recording materials of the plurality of kinds different in rigidity, it would be considered that a change in relative position between the inner roller and the outer roller during the job is effective. However, there is a possibility that execution of such an operation during the job leads to a lowering in productivity, for example, leads to a need to extend a sheet (paper) interval. Accordingly, it is important that the above-described operation is performed while suppressing the lowering in productivity. For example, in order to move the inner roller or the outer roller, when an operation for eliminating a pressing state between the inner roller and the outer roller is executed, a time required for that purpose excessively increases, and thus constitutes a factor of the lowing in productivity in a large degree.

Incidentally, in the above, conventional problems were described taking, as an example, the secondary transfer portion which is a transfer portion of the toner image from the intermediary transfer belt onto the recording material, but there are similar problems also as to a transfer portion of the toner image from another belt-shaped image bearing member such as a photosensitive member onto the recording material.

SUMMARY OF THE INVENTION

Problem to be Solved by the Invention

Accordingly, an object of the present invention is to provide an image forming apparatus capable of realizing improvement in transfer property for each of recording materials of a plurality of kinds in a mixed job while suppressing a lowering in productivity.

Means for Solving the Problem

According to an embodiment of the present invention, there is provided an image forming apparatus comprising: an image forming portion configured to form a toner image; a rotatable intermediary transfer belt onto which the toner image formed by the image forming portion is transferred; an inner roller contacting an inner peripheral surface of the intermediary transfer belt and configured to stretch the intermediary transfer belt; an outer roller contactable to an outer peripheral surface of the intermediary transfer belt and configured to form a transfer nip, where the toner image is transferred from the intermediary transfer belt onto a recording material, by nipping the intermediary transfer belt between itself and the inner roller; a contact and separation mechanism configured to bring the outer roller into contact with and separation from the intermediary transfer belt; a moving mechanism capable of moving a position of the transfer nip with respect to a circumferential direction of the inner roller by moving a position of the inner roller, wherein the moving mechanism is capable of moving the position of the inner roller to a first position where the position of the transfer nip corresponds to a first transfer position and to a second position where the position of the transfer nip corresponds to a second transfer position; a driving device configured to drive the intermediary transfer belt; and a controller configured to control the moving mechanism and the contact and separation mechanism, wherein in a case that a mode in which the position of the inner roller is moved by the moving mechanism in a period after a preceding recording material passes through the transfer nip and until a recording material subsequent to the preceding recording material reaches the transfer nip during execution of a continuous image forming job for forming and outputting images on a plurality of recording materials, in the period, the controller: (i) moves the position of the inner roller in a state in which the outer roller contacts the intermediary transfer belt, and then (ii) controls an image forming operation so that formation of a latent image for the recording material subsequent to the preceding recording material is started after movement of the position of the inner roller is completed, and the controller controls the contact and separation mechanism so as to separate the outer roller from the intermediary transfer belt with an end of the job.

EMBODIMENTS FOR CARRYING OUT THE INVENTION

In the following, an image forming apparatus according to the present invention will be described in accordance with the drawings.

Embodiment 1

1. General Constitution and Operation of Image Forming Apparatus

Figure 1:
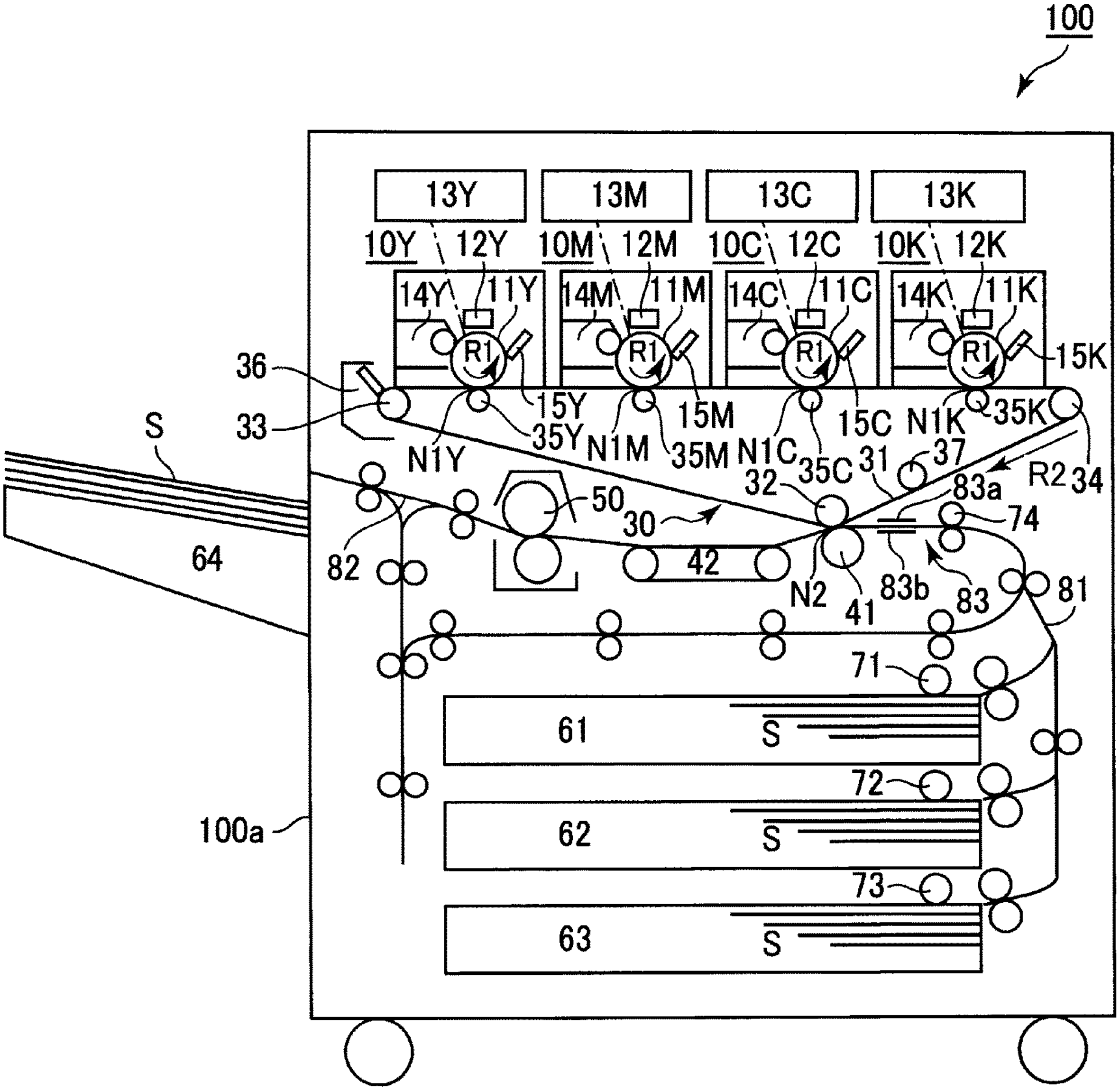
FIG. 1 is a schematic sectional view of an image forming apparatus.

FIG. 1 is a schematic sectional view of an image forming apparatus 100 of the present invention. The image forming apparatus 100 of this embodiment is a tandem multi-function machine (having functions of a copying machine, a printer and a facsimile machine) employing an intermediary transfer type system. For example, in accordance with an image signal sent from an external device, the image forming apparatus 100 is capable of forming a full-color image on a sheet-like recording material (a transfer material, a sheet material) S such as paper by using an electrophotographic type system.

The image forming apparatus 100 includes, as a plurality of image forming portions (stations), four image forming portions 10Y, 10M, 10C and 10K for forming images of yellow (Y), magenta (M), cyan (C) and black (K), respectively. These image forming portions 10Y, 10M, 10C and 10K are disposed in series along a movement direction of an image transfer surface disposed substantially parallel to an intermediary transfer belt 31 (described later). As regards elements of the image forming portions 10Y, 10M, 10C and 10K having the same or corresponding functions or constitutions, suffixes Y, M, C and K for representing the elements for associated colors are omitted, and the elements will be collectively described in some instances. In this embodiment, the image forming portion 10 is constituted by including a photosensitive drum 11 (11Y, 11K, 11C, 11K), a charging device 12 (12Y, 12M, 12C, 12K), an exposure device 13 (13Y, 13M, 13C, 13K), a developing device 14 (14Y, 14M, 14C, 14K), a primary transfer roller 35 (35Y, 35M, 35C, 35K), a cleaning device 15 (15Y, 15M, 15C, 15K) and the like, which are described later.

As a first image bearing member for bearing a toner image, the photosensitive drum 11 which is a photosensitive member (electrophotographic photosensitive member) of a rotatable drum type is rotationally driven in an arrow R1 direction (counterclockwise) in the figure by transmission of a driving force from a drum driving motor 111 (FIG. 8) as a driving source. A surface of the rotating photosensitive drum 11 is electrically charged uniformly to a predetermined polarity (negative in this embodiment) and a predetermined potential by the charging device as a charging means. During a charging process, to the charging device 12, a predetermined charging voltage is applied by a charging power source (not shown). The charged surface of the photosensitive drum 11 is subjected to scanning exposure to light depending on an image signal by the exposure device 13 as an exposure means (electrostatic image forming means), so that an electrostatic image (electrostatic latent image) is formed on the photosensitive drum 11. In this embodiment, the exposure device 13 is constituted by a laser scanner device for irradiating the photosensitive drum 11 with laser light modulated depending on the image signal. The electrostatic image formed on the photosensitive drum 11 is developed (visualized) by being supplied with toner as a developer by the developing device 14 as a developing means, so that a toner image (developer image) is formed on the photosensitive drum 11. In this embodiment, on an exposure portion (image portion) on the photosensitive drum 11 lowered in absolute value of potential by the exposure to light after the uniform charging process, the toner charged to the same polarity (negative polarity in this embodiment) as a charge polarity of the photosensitive drum 11 is deposited (reverse development). The developing device 14 includes a developing roller, which is a rotatable developer carrying member, for feeding the developer to a developing position which is an opposing portion to the photosensitive drum 11 while carrying the developer. The developing roller is rotationally driven by transmission of the driving force from a developing motor 113 (FIG. 8) as a driving source. Further, during the development, to the developing roller, a predetermined developing voltage is applied by a developing power source (not shown).

As a second image bearing member for bearing the toner image, the intermediary transfer belt 31, which is a rotatable intermediary transfer member constituted by an endless belt, is provided so as to oppose the four photosensitive drums 11Y, 11M, 11C and 11K. The intermediary transfer belt 31 is extended around and stretched by, as a plurality of stretching rollers (supporting rollers), a driving roller 33, a tension roller 34, a pre-secondary transfer roller 37 and an inner roller 32 (secondary transfer opposite roller, inner member). The driving roller 33 transmits the driving force to the intermediary transfer belt 31. The tension roller 34 imparts a predetermined tensile force (tension) to the intermediary transfer belt 31. The pre-secondary transfer roller 37 forms a surface of the intermediary transfer belt 31 in the neighborhood of a secondary transfer nip N2 (described later) on a side upstream of the secondary transfer nip N2 with respect to a rotational direction (travelling direction) of the intermediary transfer belt 31. The inner roller 32 functions as an opposing member (opposite electrode) to an outer roller 41 (described later). The intermediary transfer belt 31 is rotated (circulated and moved) in an arrow R2 direction in the figure by rotationally driving the driving roller 33 through transmission of the driving force thereto from a belt driving motor 112 as a driving source (driving device). In this embodiment, the intermediary transfer belt 31 is rotationally driven so that a circumferential speed is 400 mm/sec as an example. Of the plurality of stretching rollers, the stretching rollers other than the driving roller 33 are rotated by rotation of the intermediary transfer belt 31. On the inner peripheral surface side of the intermediary transfer belt 31, primary transfer rollers 35Y, 35M, 35C and 35K, which are roller-like primary transfer members as primary transfer means are disposed correspondingly to the respective photosensitive drums 11Y, 11M, 11C and 11K. The primary transfer roller 35 presses the intermediary transfer belt 31 toward the photosensitive drum 11, and forms a primary transfer nip N1 as a primary transfer portion which is a contact portion between the photosensitive drum 11 and the intermediary transfer belt 31. Incidentally, in this embodiment, the tension roller 34 also functions as a steering roller. That is, in this embodiment, the tension roller 34 imparts the predetermined tension to the intermediary transfer belt 31 and corrects shift (lateral shift of a travelling position with respect to a widthwise direction substantially perpendicular to a movement direction of the surface of the intermediary transfer belt 31) of the intermediary transfer belt 31 by being tilted.

The toner image formed on the photosensitive drum 11 as described above is primary-transferred onto the rotating intermediary transfer belt 31 in the primary nip N1 by the action of the primary transfer roller 35. During the primary transfer, to the primary transfer roller 35, a primary transfer voltage which is a DC voltage of an opposite polarity to a normal charge polarity (the charge polarity of the toner during the development) of the toner is applied by a primary transfer voltage source (not shown). For example, during full-color image formation, the color toner images of yellow, magenta, cyan and black formed on the respective photosensitive drums 11 are successively primary-transferred superposedly onto the same image forming region on the intermediary transfer belt 31. In this embodiment, the primary transfer nip N1 is an image forming position where the toner image is formed on the intermediary transfer belt 31. Further, the intermediary transfer belt 31 is an example of an endless belt rotatable while feeding the toner image carried in the image forming position.

On an outer peripheral surface side of the intermediary transfer belt 31, in a position opposing the inner roller 32, an outer roller (secondary transfer roller, outer member) 41 which is a roller-like secondary transfer member as a secondary transfer means is provided. The outer roller 41 is pressed toward the inner roller 32 through the intermediary transfer belt 31 and forms a secondary transfer nip N2 as a secondary transfer portion which is a contact portion between the intermediary transfer belt 31 and the outer roller 41. The toner images formed on the intermediary transfer belt 31 as described above are secondary-transferred onto a recording material S nipped and fed by the intermediary transfer belt 31 and the outer roller 41 in the secondary transfer portion N2 by the action of the outer roller 41. In this embodiment, during the secondary transfer, to the outer roller 41, a secondary transfer voltage which is a DC voltage of the opposite polarity to the normal charge polarity of the toner is applied by a secondary transfer power source (not shown). In this embodiment, the inner roller 32 is electrically grounded (connected to the ground). Incidentally, the inner roller 32 is used as a secondary transfer member and a secondary transfer voltage of the same polarity as the normal charge polarity of the toner is applied thereto, and the outer roller 41 is used as an opposite electrode and may also be electrically grounded.

The recording material S is fed to the secondary transfer nip N2 by being timed to the toner image on the intermediary transfer belt 31. That is, the recording materials S accommodated in recording material cassettes 61, 62 and 63 are sent by rotation of either of feeding rollers 71, 72 and 73, respectively, constituting a feeding device. This recording material S passes through a feeding (conveying) passage 81 and then is fed to registration rollers (registration roller pair) 74 which are a feeding member as a feeding means and is once stopped by the registration rollers 74. Then, this recording material S is sent into the secondary transfer nip N2 by rotational drive of the registration rollers 74 so that the toner image on the intermediary transfer belt 31 coincides with a desired image forming region on the recording material S in the secondary transfer nip N2. With respect to the feeding direction of the recording material S, a feeding guide 83 for guiding the recording material S to the secondary transfer nip N2 is provided downstream of the registration rollers 74 and upstream of the secondary transfer nip N2. The feeding guide 83 is constituted by including a first guiding member 83*a* contactable to a front surface of the recording material S (a surface onto which the toner image is to be transferred immediately after the recording material S passes through the feeding guide 83) and a second guiding member 83*b* contactable to a back surface of the recording material S (a surface opposite from the front surface). The first guiding member 83*a* and the second guiding member 83*b* are disposed opposed to each other, and the recording material S passes through between these (both) members. The first guiding member 83*a* restricts movement of the recording material S in a direction approaching the intermediary transfer belt 31. The second guiding member 83*b* restricts movement of the recording material S in a direction away from the intermediary transfer belt 31.

The recording material S on which the toner images are transferred is fed by a feeding belt 42 toward a fixing device 50 as a fixing means. The fixing device 50 heats and presses the recording material S carrying thereon unfixed toner images, and thus fixes (melts, sticks) the toner images on the surface of the recording material P. Thereafter, the recording material S on which the toner images are fixed passes through a discharge feeding passage 82 and is discharged (outputted) toward a discharge tray 64 provided on an outside of an apparatus main assembly 100*a* of the image forming apparatus 100.

On the other hand, toner (primary transfer residual toner) remaining on the photosensitive drum 11 after the primary transfer is removed and collected from (the surface of) the photosensitive drum 11 by a cleaning device 15 as a cleaning means. Further, deposited matters such as toner (secondary transfer residual toner) remaining on the intermediary transfer belt 31 after the secondary transfer, and paper powder deposited from the recording material S are removed and collected from (the surface of) the intermediary transfer belt 31 by a belt cleaning device 36 as an intermediary member cleaning means.

Incidentally, in this embodiment, an intermediary transfer belt unit 30 as a belt feeding device is constituted by including the intermediary transfer belt 31 stretched by the plurality of stretching rollers, the respective primary transfer rollers 35, the belt cleaning device 36, a frame supporting these members, and the like. The intermediary transfer belt unit 30 is mountable in and dismountable from the apparatus main assembly 100*a* for maintenance and exchange.

Here, as the intermediary transfer belt 31, one constituted by a resin-based material formed in a single layer structure or a multi-layer structure can be used. Further, as the intermediary transfer belt 31, one of 40 μm or more in thickness, 1.0 GPa or more in Young's modulus, and $1.0\times10^{9}$-$5.0\times10^{13}$ Ω/□in surface resistivity may preferably be used.

Further, in this embodiment, the inner roller 32 is constituted by providing an elastic layer (rubber layer) formed with a rubber material as an elastic material on an outer peripheral surface of a core metal (base material) made of metal. This elastic layer can be formed with an EPDM rubber (which may contain an electroconductive material), for example. In this embodiment, the inner roller 32 is formed so that an outer diameter thereof is 20 mm and a thickness of the elastic layer is 0.5 mm. Further, in this embodiment, a hardness of the elastic layer of the inner roller 32 is set at, for example, about 70° (JIS-A). Incidentally, the inner roller 32 may also be constituted by a metal roller formed of a metal material such as SUM or SUS. Incidentally, the pre-secondary transfer roller 37 can be constituted similarly as the inner roller 32.

Further, in this embodiment, the outer roller 41 is constituted by providing an electroconductive elastic layer (which may also be a solid rubber layer or a sponge layer (elastic foam member layer)) formed of an electroconductive rubber material as an electroconductive elastic material on an outer peripheral surface of a core metal (base material). This elastic layer can be formed with, for example, metal complex, NBR rubber or EPDM rubber, which contains an electroconductive agent such as carbon black. In this embodiment, the outer roller 41 is formed so that an outer diameter of the core metal is 12 mm and a thickness of the elastic layer is 6 mm and so that an outer diameter of the outer roller 41 is 24 mm. Further, in this embodiment, a hardness of the elastic layer of the outer roller 41 is set at, for example, about 28° (Asker-C). Further, the outer roller 41 is urged toward the inner roller 32 through the intermediary transfer belt 31 by pressing springs 44 (FIG. 4) which are urging members (elastic members) as urging means so that the outer roller 41 contacts the inner roller 32 while nipping the intermediary transfer belt 31 therebetween.

In this embodiment, rotational axis directions of the stretching rollers including the inner roller 32 for the intermediary transfer belt 31 and the outer roller 41 are substantially parallel to each other. Supporting constitutions of the inner roller 32 and the outer roller 41 will be further described later.

2. Shift of Intermediary Transfer Belt Control

As regards the intermediary transfer belt 31, shift is generated depending on a position (alignment) of the stretching roller, imbalance of a pressing force, and the like. The shift of the intermediary transfer belt 31 can be controlled by using, as a steering roller, at least one of the plurality of stretching rollers and by changing the travelling direction of the intermediary transfer belt through inclination of a rotational axis thereof relative to rotational axes of other stretching rollers.

In this embodiment, the image forming apparatus 100 includes a steering mechanism as a shift control means for controlling the shift of the intermediary transfer belt 31. In this embodiment, the steering mechanism controls the shift by using a signal of a sensor provided at an end portion of the intermediary transfer belt 31 with respect to a widthwise direction of the intermediary transfer belt 31 and by changing alignment of the tension roller (functioning also as the steering roller) 34 so that a detection value of the sensor becomes substantially constant. In the following, this will be described further with more specificity.

Figure 2:
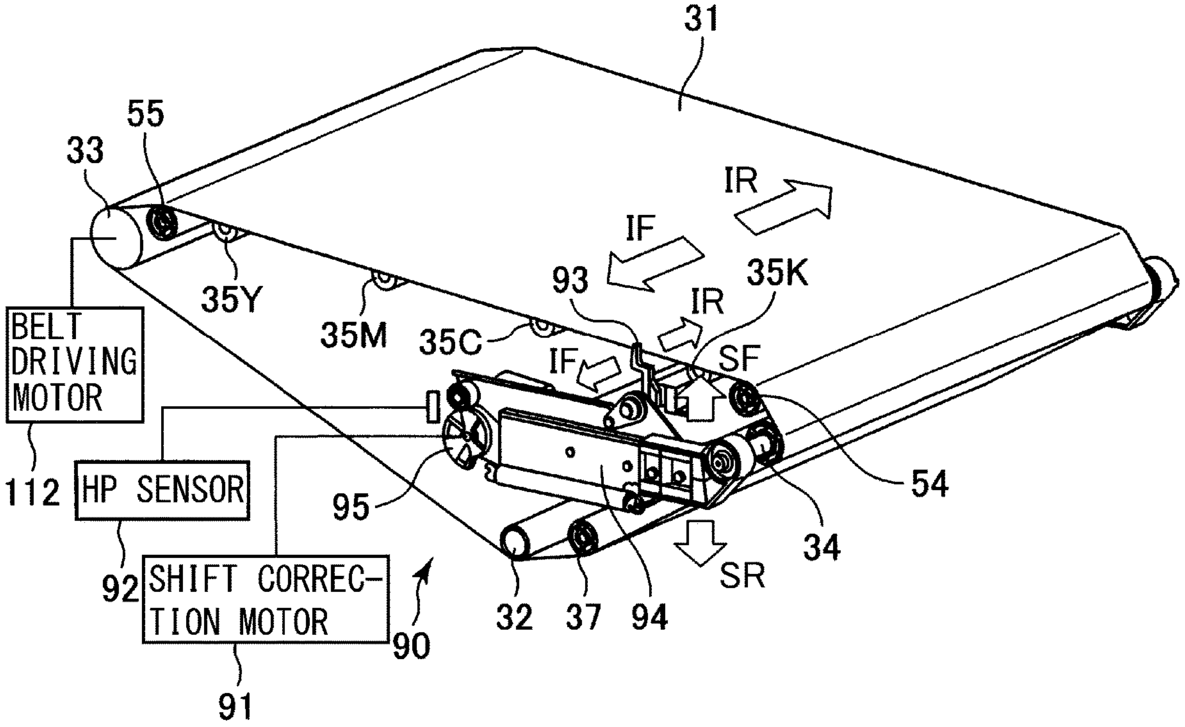
FIG. 2 is a schematic perspective view of a periphery of an intermediary transfer belt for illustrating shift control.

FIG. 2 is a schematic perspective view for illustrating the steering mechanism 90 in this embodiment. As described above, in this embodiment, the tension roller 34 functions also as the steering roller. In this embodiment, the tension roller 34 is disposed on a side downstream of the primary transfer nip N1 (most downstream primary transfer nip N1K) and upstream of the secondary transfer nip N2 with respect to the rotational direction of the intermediary transfer belt 31. Incidentally, as shown in FIG. 2, the plurality of stretching rollers may further include other stretching rollers such as auxiliary rollers 54 and 55 forming an image transfer surface disposed substantially horizontally in this embodiment. In an example shown in FIG. 2, with respect to the rotational direction of the intermediary transfer belt 31, the downstream-side auxiliary roller 54 is disposed on the side downstream of the primary transfer nip N1 (most downstream primary transfer nip N1K) and upstream of the tension roller 34. Further, with respect to the rotational direction of the intermediary transfer belt 31, the upstream-side auxiliary roller 55 is disposed on a side downstream of the driving roller 33 and upstream of the primary transfer nip N1 (most upstream primary transfer nip N1K). These auxiliary rollers 54 and 55 can be provided for maintaining the image transfer surface substantially horizontally by preventing a change in inclination of the intermediary transfer belt 31 with tilting of the tension roller 34, for example.

The tension roller 34 is rotatably supported by the intermediary transfer belt unit 30 through bearing members (not shown) at opposite end portions with respect to a rotational axis direction thereof. The bearing members provided at the opposite end portions with respect to the rotational axis direction of the tension roller 34 are each supported slidably movable in a direction from an inner peripheral surface side toward an outer peripheral surface side of the intermediary transfer belt 31 and a direction opposite to the direction. Further, the bearing members provided at the opposite end portions are each pressed (urged) in a direction from the inner peripheral surface side toward the outer peripheral surface side of the intermediary transfer belt 31 by an urging force of a compression spring or the like which is an urging member (elastic member) as an urging means. By this, the tension roller 34 imparts a predetermined tension to the intermediary transfer belt 31. Further, the bearing member provided at one end portion (rear side of the paper surface in FIG. 2) with respect to the rotational axis direction of the tension roller 34 is rotatable around a rotational axis substantially perpendicular to the rotational axis direction of the tension roller 34. Further, the bearing member provided at the other end portion (front side of the paper surface in FIG. 2) with respect to the rotational axis direction of the tension roller 34 is supported by a frame of the intermediary transfer belt unit 30 through a shift correcting arm 94. This shift correcting arm 94 is rotatable (swingable) around the rotational axis substantially parallel to the rotational axis direction of the tension roller 34. By this, the tension roller 34 is capable of rotating the front-side end portion in FIG. 2 so as to move in an up-down direction in FIG. 2. Thus, by rotating the tension roller 34, the tension roller 34 can be tilted so that the rotational axis of the tension roller 34 is inclined relative to the rotational axes of other supporting rollers such as the driving roller 33.

When the intermediary transfer belt 31 shifts toward the front side or the rear side in FIG. 2, a shift detecting sensor 93 is moved in an arrow IF direction or an arrow IR direction in FIG. 2 by an end portion of the intermediary transfer belt 31 with respect to a widthwise direction of the intermediary transfer belt 31. A signal indicating a detection result of the shift detecting sensor 93 is inputted to a controller 150 (FIG. 8) (described later). The controller 150 drives a shift correcting motor 91 as a driving source depending on a travelling position of the intermediary transfer belt 31, with respect to the widthwise direction of the intermediary transfer belt 31, detected by the shift detecting sensor 93. When the shift correcting motor 91 is driven, a shift correcting cam 95 is rotated, and swings the shift correcting arm 94. By this, the front-side end portion of the tension roller 34 in FIG. 2 is moved up or down (in an arrow SF direction or in an arrow SR direction), so that the tension roller 34 is tilted. Thus, by the tilting of the tension roller 34, the intermediary transfer belt 31 is moved in the arrow IF direction or the arrow IR direction in FIG. 2. By continuing these operations, the shift of the intermediary transfer belt 31 is corrected.

An inclination position of the tension roller 34 is detected by a HP (home position) sensor 92 provided coaxially with a rotational axis of the shift correcting cam 95. Further, the shift detecting sensor 93 is constituted by including, for example, a flag contactable to the end portion of the intermediary transfer belt 31 with respect to the widthwise direction, an LED as a light emitting portion, and two photodiodes as a light receiving portion. Depending on a position of the flag of the shift detecting sensor 93, a light receiving amount of the two photodiodes is changed. By detecting this light receiving amount, the travelling position of the intermediary transfer belt 31 with respect to the widthwise direction is capable of being grasped.

In this embodiment, the steering mechanism 90 is constituted by including the shift correcting motor 91, the HP sensor 92, the shift detecting sensor 93, the shift correcting arm 94, the shift correcting cam 95, and the like.

Incidentally, the constitution for controlling the shift of the intermediary transfer belt 31 is not limited to the constitution in this embodiment, but for example, a known constitution can be used. For example, there is also a constitution using a method which is called self-alignment such that the shift is automatically controlled using a frictional force without using the sensors.

3. Offset

Figure 3:
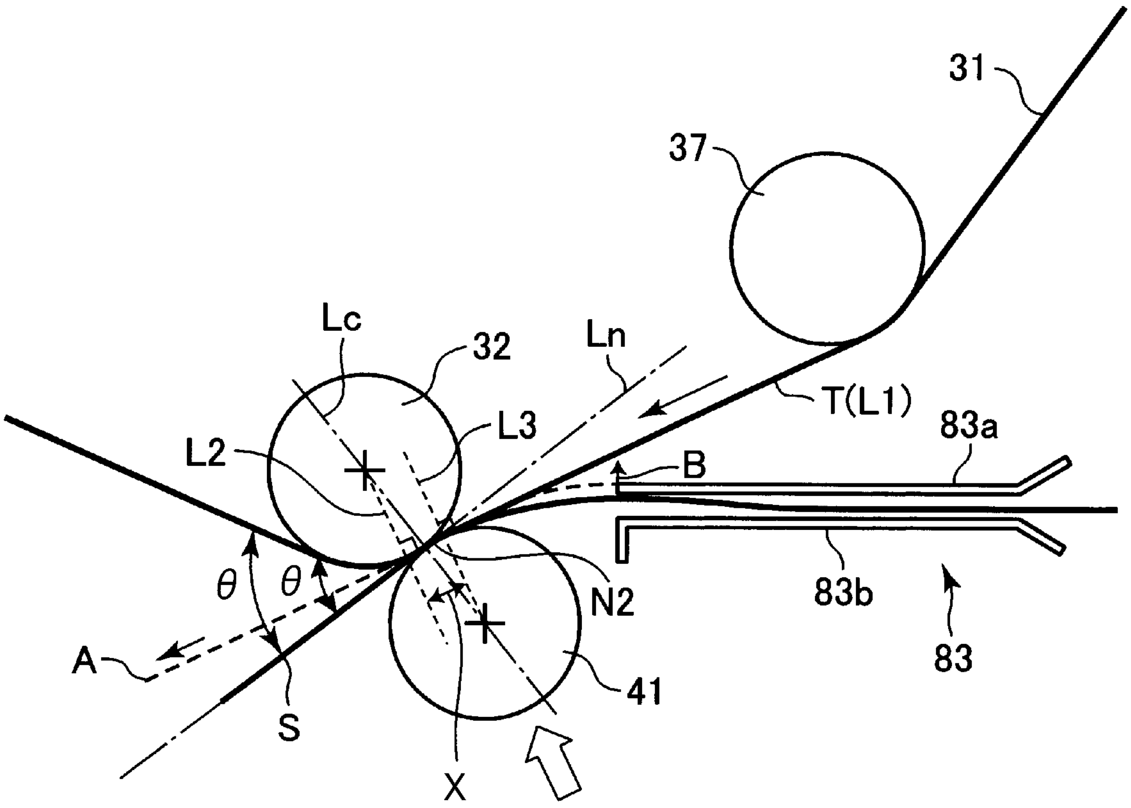
FIG. 3 is a schematic sectional view for illustrating an offset amount.

FIG. 3 is a schematic sectional view (a cross section substantially perpendicular to the rotational axis direction of the inner roller 32) for illustrating behavior of the recording material S in the neighborhood of the secondary transfer nip N2. Incidentally, in FIG. 3, elements having the same or corresponding functions or constitutions to those of the elements of the image forming apparatus 100 in this embodiment are represented by adding the same reference symbols.

As described above, depending on the rigidity of the shape (position of the secondary transfer nip N2) of the secondary transfer nip N2 and the rigidity of the recording material S, the behavior of the recording material S in the neighborhood of the secondary transfer nip N2 on sides upstream and downstream of the secondary transfer nip N2 with respect to the feeding direction of the recording material S changes. Further, for example, in the case where the recording material S is "thin paper" which is an example of the recording material S small in rigidity, a jam (paper jam) occurs in some instances due to improper separation of the recording material P from the intermediary transfer belt 31. This phenomenon becomes conspicuous in the case where the rigidity of the recording material S is small since the recording material S is liable to stick to the intermediary transfer belt 31 due to weak stiffness of the recording material S.

That is, in the cross section shown in FIG. 3, a line showing a stretching surface of the intermediary transfer belt 31 stretched and formed by the inner roller 32 and the pre-secondary transfer roller 37 is a pre-nip stretching line T. The pre-secondary transfer roller 37 in an example of the upstream rollers, of the plurality of stretching rollers, disposed adjacent to the inner roller 32 on a side upstream of the inner roller 32 with respect to the rotational direction of the intermediary transfer belt 31. Further, in the same cross section, a rectilinear line passing through a rotation center of the inner roller 32 and a rotation center of the outer roller 41 is a nip center line Lc. Further, in the same cross section, a rectilinear line substantially perpendicular to the nip center line Lc is a nip line Ln. Incidentally, FIG. 3 shows a state in which with respect to a direction along the pre-nip stretching line T, the rotation center of the outer roller 41 is offset and disposed on a side upstream of the rotation center of the inner roller 32 with respect to the rotational direction of the intermediary transfer belt 31.

At this time, the recording material S has a tendency to maintain an attitude substantially along the nip line Ln in a state in which the recording material S is nipped between the inner roller 32 and the outer roller 41 in the secondary transfer nip N2. For that reason, in general, in the case where the rotation center of the inner roller 32 and the rotation center of the outer roller 41 are close to each other with respect to the direction along the pre-nip stretching line T, as shown by a broken line A in FIG. 3, a discharge angle θ of the recording material P becomes small. That is, a leading end of the recording material S adopts an attitude such that the recording material S is discharged near the intermediary transfer belt 31 when the recording material S is discharged from the secondary transfer nip N2. By this, the recording material S is liable to stick to the intermediary transfer belt 31. On the other hand, in general, in the case where the rotation center of the outer roller 41 is disposed on a side more upstream of the rotation center of the inner roller 32 with respect to the direction along the pre-nip rotation centering line T, as shown by a solid line in FIG. 3, the discharge angle θ of the recording material S becomes large. That is, the leading end of the recording material S adopts an attitude such that the recording material S is discharged in a direction away from the intermediary transfer belt 31 when the recording material S is discharged from the secondary transfer nip N2. By this, the recording material S does not readily stick to the intermediary transfer belt 31.

On the other hand as described above, for example, in the case where the recording material S is "thick paper" which is an example of a recording material S large in rigidity, when a trailing end of the recording material S with respect to the feeding direction of the recording material S passes through the feeding guide 83, a trailing end portion of the recording material S collides with the intermediary transfer belt 31 in some instances. By this, an image defect occurs at the trailing end portion of the recording material S with respect to the feeding direction in some instances. This phenomenon becomes conspicuous in the case where the rigidity of the recording material S is large since due to strong stiffness of the recording material S, the trailing end portion of the recording material S with respect to the feeding direction is liable to vigorously collide with the intermediary transfer belt 31.

That is, as described above, in the cross section shown in FIG. 3, in a state in which the recording material S is nipped between the inner roller 32 and the outer roller 41 in the secondary transfer nip N2, the recording material S has a is tendency to maintain the attitude thereof substantially along the nip line Ln. For that reason, in general, the nip line Ln is in the form of intersecting with the pre-nip stretching line T as with respect to the direction along the pre-nip stretching line T, and the rotation center of the outer roller 41 is disposed on a side more upstream than the rotation center of the inner roller 32 in the rotational direction of the recording material S. As a result, when the trailing end of the recording material S with respect to the feeding direction passes through the feeding guide 83, as shown by a broken line B in FIG. 3, the trailing end portion of the recording material S with respect to the feeding direction collides with the intermediary transfer belt 31, so that the image defect is liable to occur at the trailing end portion of the recording material S with respect to the feeding direction. On the other hand, in general, when the rotation center of the inner roller 32 and the rotation center of the outer roller 41 are brought near to each other with respect to the direction along the pre-nip stretching line T, collision of the recording material S with the intermediary transfer belt 31 when the trailing end of the recording material S with respect to the feeding direction passes through the feeding guide 83 is suppressed. By this, the image defect at the trailing end portion of the recording material S with respect to the feeding direction does not readily occur.

As a countermeasure to such a problem, depending on the kind of the recording material S, it is effective to change a relative position between the inner roller 32 and the outer roller 41 with respect to a circumferential direction of the inner roller 32 (the rotational direction of the intermediary transfer belt 31). With reference to FIG. 3, the definition of the relative position between the inner roller 32 and the outer roller 41 will be described. In the cross section shown in FIG. 3, a common tangential line of the inner roller 32 and the pre-secondary transfer roller 37 on a side where the intermediary transfer belt 31 is extended around the stretching rollers is a reference line L1. The reference line L1 corresponds to the pre-nip stretching line T. Further, in the same cross section, a rectilinear line which passes through the rotation center of the inner roller 32 and which is substantially perpendicular to the reference line L1 is an inner roller center line L2. Further, in the same cross section, a rectilinear line which passes through the rotation center of the outer roller 41 and which is substantially perpendicular to the reference line L1 is an outer roller center line L3. At this time, a distance (vertical distance) between the inner roller center line L2 and the outer roller center line L3 is defined as an offset amount X (where the offset amount X is a positive value when the outer roller center line L3 is on the side upstream of the inner roller center line L2 with respect to the rotational direction of the intermediary transfer belt 31). The offset amount X can take a negative value, 0, and the positive value. By making the offset amount X large, a width of the secondary transfer nip N2 with respect to the rotational direction of the intermediary transfer belt 31 extends toward an upstream side of the rotational direction of the intermediary transfer belt 31. That is, with respect to the rotational direction of the intermediary transfer belt 31, an upstream-side end portion of a contact region between the outer roller 41 and the intermediary transfer belt 31 is positioned further on an upstream side than an upstream-side end portion of a contact region between the inner roller 32 and the intermediary transfer belt 31 is. Thus, by changing a position of at least one of the inner roller 32 and the outer roller 41, the relative position between the inner roller 32 and the outer roller 41 with respect to the circumferential direction of the inner roller 32 is changed, so that the position of the secondary transfer nip (transfer portion) N2 is changeable.

In FIG. 3, the outer roller 41 is illustrated so as to virtually contact the reference line L1 (pre-nip stretching line T) without being deformed. However, a material of an outermost layer of the outer roller 41 is an elastic member such as a rubber or a sponge, so that in actuality, the outer roller 41 is pressed and deformed in a direction toward the inner roller 32 by the pressing spring 44. When the outer roller 41 is offset and disposed toward the upstream side with respect to the rotational direction of the intermediary transfer belt 31 relative to the inner roller 32 and is pressed by the pressing spring 44 so as to nip the intermediary transfer belt 31 between itself and the inner roller 32, the secondary transfer nip N2 in a substantially S shape is formed. Then, the attitude of the recording material S guided and sent to the feeding guide 83 is also determined in conformity to the shape of the secondary transfer nip N2. With an increasing offset amount X, a degree of bending of the recording material S increases. For that reason, as described above, for example, in the case where the recording material S is the "thin paper", by making the offset amount X large, the separating property of the recording material P, from the intermediary transfer belt 31, passed through the secondary transfer nip N2 can be improved. However, when the offset amount X is large, as described above, in the case where for example, the recording material S is the "thick paper", when the trailing end of the recording material S with respect to the recording material feeding direction passed through the feeding guide 83, the trailing end portion of the recording material S with respect to the recording material feeding direction collides with the intermediary transfer belt 31. By this, a lowering in image quality of the trailing end portion of the recording material S with respect to the recording material feeding direction is caused. For this reason, in this case, it may only be required that the offset amount X is made small.

In this embodiment, the image forming apparatus 100 changes the offset amount X by changing the position of at least one of the inner roller 32 or the outer roller 41. Particularly, in this embodiment, the image forming apparatus 100 changes the offset amount by changing the position of the inner roller 32. Further, in this embodiment, the image forming apparatus 100 changes the offset amount X on the basis of information on the kind of the recording material S relating to rigidity of the recording material S. For example, in the case where the recording material S is the "thick paper", the inner roller 32 is disposed in a first inner roller position where the offset amount X is a first offset amount X1. Further, for example, in the case where the recording material S is the "thin paper", the inner roller 32 is disposed in a second inner roller position where the offset amount X is a second offset amount X2 larger than the first offset amount X1. The first offset amount X1 may be a positive value, 0 and a negative value, and the second offset amount X2 is typically a positive value.

4. Constitution Relating to Secondary Transfer

A constitution relating to the secondary transfer in this embodiment will be described specifically. Here, for simplicity, as the information on the kind of the recording material S principally relating to the rigidity of the recording material S, the case where information on a basis weight of paper as the recording material S will be described as an example. Then, as an example of the recording material S small in rigidity, the "thin paper" is used, and as an example of the recording material S large in rigidity, the "thick paper" is used. However, as described later, the information on the kind of the recording material S relating to the rigidity of the recording material S is not limited to the information on the basis weight of the recording material S.

Figure 4:
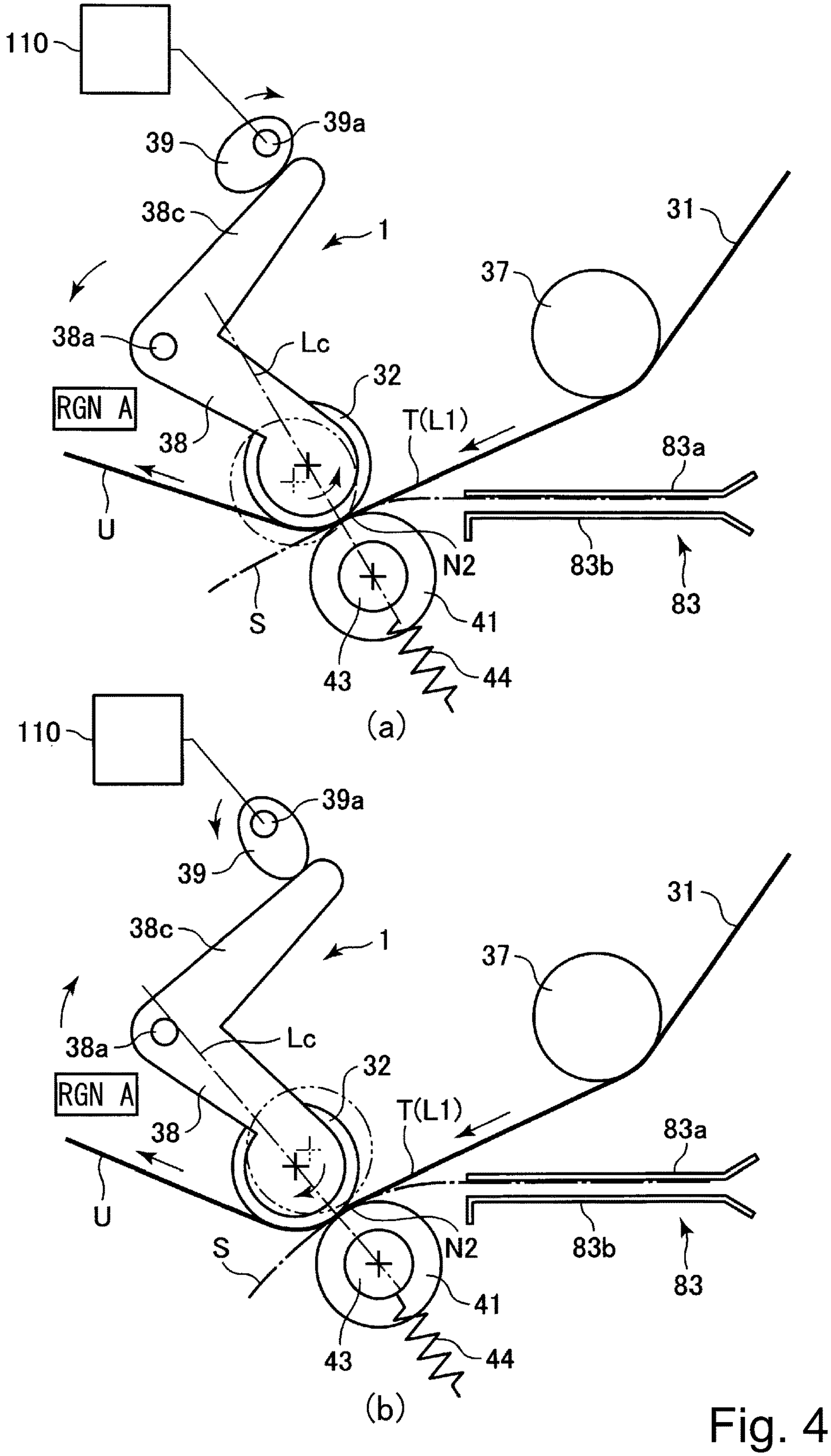
FIG. 4 includes schematic side views at parts (a) and (b) showing an offset mechanism.

Parts (a) and (b) of FIG. 4 are schematic side views of a principal part of the neighborhood of the secondary transfer nip N2 in this embodiment as seen substantially in parallel to the rotational axis direction from one end portion side (the front side of the paper surface in FIG. 1) with respect to the rotational axis direction of the inner roller 32. Part (a) of FIG. 4 shows a state of the case of the "thick paper", and part (b) of FIG. 4 shows a state of the case of the "thin paper". Incidentally, for example, the cases of the "thin paper" and the "thick paper" refer to the cases where the "thin paper" and the "thick paper" are caused to pass through the secondary transfer nip N2.

4-1. Offset Mechanism

As shown in parts (a) and (b) of FIG. 4, in this embodiment, the image forming apparatus 100 includes the offset mechanism (offset amount changing mechanism, moving mechanism) 1 as a position changing mechanism for changing the offset amount X by changing the relative position of the inner roller 32 to the outer roller 41. In parts (a) and (b) of FIG. 4, a structure of the inner roller 32 at one end portion with respect to the rotational axis direction of the inner roller 32 is shown, but a structure of the inner roller 32 at the other end portion is also the same (these (opposite) end portions are substantially symmetrical to each other with respect to a center of the inner roller 32 with respect to the rotational axis direction).

The opposite end portions of the inner roller 32 with respect to the rotational axis direction are rotatably supported by an inner roller holder 38 as a supporting member. The inner roller holder 38 is supported by a frame or the like of the intermediary transfer belt unit 30 so as to be rotatable about a rotation shaft 38*a*. Thus, the inner roller holder 38 is rotated about the rotation shaft 38*a*, so that the inner roller 32 is rotated about the rotation shaft 38*a*, so that the relative position of the inner roller 32 to the outer roller 41 is changed and thus the offset amount X can be changed.

The inner roller holder 38 is constituted so as to be rotated by the action of an offset cam 39 as an acting member. The offset cam 39 is supported by the frame or the like of the intermediary transfer belt unit 30 so as to be rotatable about an offset cam rotation shaft 39*a*. The offset cam 39 is rotatable about the offset cam rotation shaft 39*a* by receiving the drive from an offset motor 110 as a driving source. Further, the offset cam 39 contacts an offset cam follower (arm portion) 38*c* provided as a part of the inner roller holder 38. Further, the inner roller holder 38 is urged by tension of the intermediary transfer belt 31 in this embodiment as described later so that the offset cam follower 38*c* rotates in a direction in which the offset cam follower 38*c* engages with the offset cam 39. However, the present invention is not limited thereto, but the inner roller holder 38 may also be urged by a spring or the like which is an urging member (elastic member) as an urging means so that the offset cam follower 38*c* rotates in a direction in which the offset cam follower 38*c* engages with the offset cam 39.

Thus, in this embodiment, the offset mechanism 1 is constituted by including the inner roller holder 38, the offset cam 39, the offset motor 110, and the like.

As shown in part (a) of FIG. 4, in the case of the "thick paper", the offset cam 39 is rotated, for example, clockwise by being driven by the offset motor 110. By this, the inner roller holder 38 is rotated counterclockwise about the rotation shaft 38*a*, so that the relative position of the inner roller 32 to the outer roller 41 is determined. By this, a state in which the inner roller 32 is disposed in the first inner roller position where the offset amount X is the first offset amount X1 which is relatively small is formed. As a result, as described above, it is possible to suppress a lowering in image quality at the trailing end portion of the recording material P with respect to the feeding direction of the "thick paper".

As shown in part (b) of FIG. 4, in the case of the "thin paper", the offset cam 39 is rotated, for example, counterclockwise by being driven by the offset motor 110. By this, the inner roller holder 38 is rotated clockwise about the rotation shaft 38*a*, so that the relative position of the inner roller 32 to the outer roller 41 is determined. By this, a state in which the inner roller 32 is disposed in the second inner roller position where the offset amount X is the second offset amount X2 relatively large is formed. As a result, as described above, the separating property of the "thin paper", from the intermediary transfer belt 31, passed through the secondary transfer nip N2 is improved.

Figure 5:
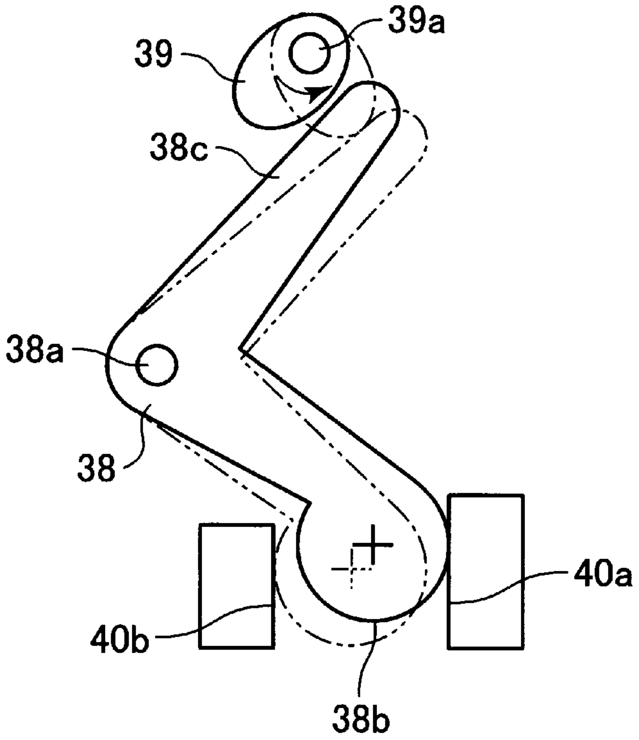
FIG. 5 is a schematic side view showing a part of the offset mechanism.

FIG. 5 is a schematic side view of the neighborhood of the inner roller holder 38 as seen in substantially parallel to the rotational axis direction of the inner roller 32 from the one end portion side (the front side of the paper surface of FIG. 1) with respect to the rotational axis direction. As described above, in the case of the "thick paper", the inner roller holder 38 rotates counterclockwise about the rotation shaft 38*a* (solid line). Then, a cylindrical abutment portion 38*b* provided as a part of the inner roller holder 38 coaxially with the inner roller 32 abuts against a first positioning portion 40*a*. By this, a position of the inner roller 32 is positioned in a first inner roller position (first offset amount X1). Further, as described above, in the case of the "thin paper", the inner roller holder 38 rotates clockwise about the rotation shaft 38*a* (chain double-dashed line). Then, the abutment portion 38*b* provided as the part of the inner roller holder 38 abuts against a second positioning portion 40*b*. By this, the position of the inner roller 32 is positioned in a second inner roller position (second offset amount X2). The first and second positioning portions 40*a* and 40*b* are provided on the frame or the like of the intermediary transfer belt unit 30.

In this embodiment, on the basis of the basis weight M of the recording material S, the offset amounts X (X1, X2) are set so as to provide the following two patterns, for example. Incidentally, gsm means $g/m^2$. (a) M≥52 gsm: X1=1.0 mm (b) M<52 gsm: X2=2.5 mm In this embodiment, a state of the position of the inner roller 32 in the above-described setting (a) shown in part (a) of FIG. 4 is a home position. Here, the home position refers to a position at the time of a sleep state (described later) of the image forming apparatus 100 or of a state in which a main power source is turned OFF. However, the present invention is not limited to this, but a state of a position of the inner roller 32 in the above-described setting (b) shown in part (b) of FIG. 4 may also be used as the home position.

The offset amount X and the kind (in this embodiment, the basis weight of the recording material S) of the recording materials assigned to the associated offset amount X are not limited to the above-described specific examples. These can appropriately be set through an experiment or the like from viewpoints of improvement in separating property of the recording material S from the intermediary transfer belt 31 and suppression of the image defect generating in the neighborhood of the secondary transfer nip N2, which are described above. The offset amount is not limited thereto, but may suitably be about −3 mm to about +3 mm. By such setting, a good transfer property can be obtained. Further, the pattern of the offset amount X is not limited to the two patterns, but three or more patterns may also be set.

Further, in accordance with this embodiment, on the basis of the information on the kind of the recording material S relating to the rigidity of the recording material S, it is possible to select an appropriate setting from settings of three or more patterns.

Here, in this embodiment, in the cross sections shown in FIG. 4, to the inner roller holder 38, counterclockwise moment about the rotation shaft 38*a* is always applied by the tension of the intermediary transfer belt 31. That is, in this embodiment, by the tension of the intermediary transfer belt 31, moment in a direction in which the offset cam follower 38*c* rotates so as to engage with the offset cam 39 is always applied to the inner roller holder 38. Further, in this embodiment, in the cross-section shown in FIG. 4, the rotation shaft 38*a* is disposed on a side downstream, with respect to the feeding direction of the recording material S, of the rectilinear line (nip center line) Lc connecting the rotation center of the inner roller 32 and the rotation center of the outer roller 41. By this, in the case where the outer roller 41 is contacted to the inner roller 32 through the intermediary transfer belt 31, reaction force received by the inner roller holder 38 from the outer roller 41 also constitutes the counterclockwise moment in FIG. 4. By such a constitution, the cam mechanism can be constituted without separately using an urging member such as a spring.

Further, in order to exchange the intermediary transfer belt 31, the inner roller holder 38 may desirably be disposed inside the stretching surface of the intermediary transfer belt 31 so as not to impair operativity of an operation in which the intermediary transfer belt 31 is mounted in or dismounted from the intermediary transfer belt unit 30. For that reason, in the cross section shown in FIG. 4, the rotation shaft 38*a* may desirably be disposed in a region A between the above-described rectilinear line (nip center line) Lc and a post-nip stretching line U. Here, the post-nip stretching line U is a stretching line which is a line indicating the stretching surface of the intermediary transfer belt 31 stretched and formed by the inner roller 32 and the driving roller 33 (see FIG. 1) in the cross section shown in FIG. 4. Incidentally, the driving roller 33 is an example of the downstream rollers, of the plurality of stretching rollers, disposed downstream of and adjacent to the inner roller 32 with respect to the rotational direction of the intermediary transfer belt 31.

Figure 6:
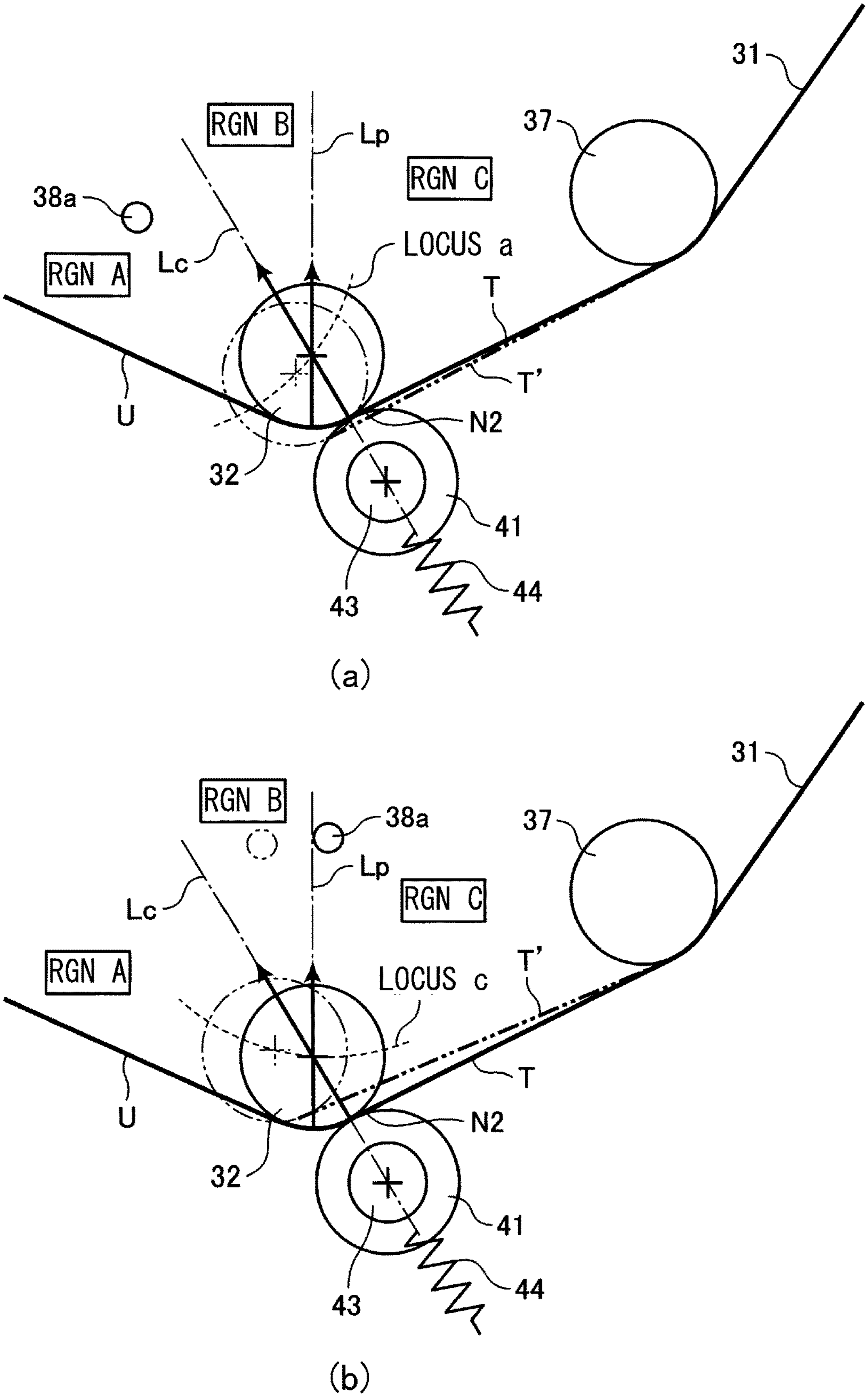
FIG. 6 includes schematic views at parts (a) and (b) for illustrating arrangement of a rotational axis of an inner roller holder.

The reason why the rotation shaft 38*a* is disposed in the region A will be described further specifically using FIG. 6. Parts (a) and (b) of FIG. 6 are schematic sectional views (cross sections substantially perpendicular to the rotational axis direction of the inner roller 32) of the neighborhood of the secondary transfer nip N2, for illustrating an effect depending on a difference in arrangement of the rotation shaft 38*a*. In parts (a) and (b) of FIG. 6, a direction of the reaction force received from the intermediary transfer belt 31 is represented by a rectilinear line Lp, and a direction of reaction force received from the outer roller 41 is represented by a rectilinear line Lc.

As shown in part (a) of FIG. 6, in this embodiment, the rotation shaft 38*a* is disposed in the region A between the post-nip stretching line U and the rectilinear line Lc. With a change of the position of the inner roller 32 along a locus a, a stretching angle of the pre-nip stretching line T is also changed as shown by a chain double-dashed line T'. Here, in a cross section shown in FIG. 6, the stretching angle of the pre-nip stretching line T can be represented by an angle formed by the pre-nip stretching surface T and a reference rectilinear line (for example, gravitation direction) with respect to a contact position between the pre-secondary transfer roller 37 and the intermediary transfer belt 31.

As shown in part (b) of FIG. 6, in the case where if the rotation shaft 38*a* is disposed in a region C between the rectilinear line Lp and the pre-nip stretching line T (solid line), both moments due to the reaction forces received from the tension of the intermediary transfer belt 31 and from the outer roller 41 are received clockwise. In this case, if the arrangement of the offset cam 39 is changed or the like, the cam mechanism can be constituted without separately adding an urging member. However, with a change of the position of the inner roller 32 along a locus c, a stretching angle of the pre-nip stretching line T is also changed as shown by a chain double-dashed line T', and a change amount thereof is larger than the change amount in the case where the rotation shaft 38*a* is disposed in the region A. The stretching angle of the pre-nip stretching line T needs to be set appropriately so that a lowering in image quality due to electric discharge between itself and the recording material S is not caused to occur. For that reason, it is desirable that the stretching angle of the pre-nip stretching line T is not changed so large by changing the offset amount X. For that reason, the rotation shaft 38*a* may preferably be disposed in the region A rather than the region C.

Further, as shown in part (b) of FIG. 6, the case where the rotation shaft 38*a* is disposed in a region B between the rectilinear line Lc and the rectilinear line Lp (dotted line) will be considered. In this case, the reaction force due to the tension of the intermediary transfer belt 31 generates the counterclockwise moment, whereas the reaction force due to the outer roller 41 generates the clockwise moment. For that reason, in order to constitute the cam mechanism by stably imparting the moment to either one of these members, there is a need to separately add an urging member such as a spring.

Accordingly, in this embodiment, the rotation shaft 38*a* is disposed in the region A.

4-2. Contact and Separation Mechanism

Figure 7:
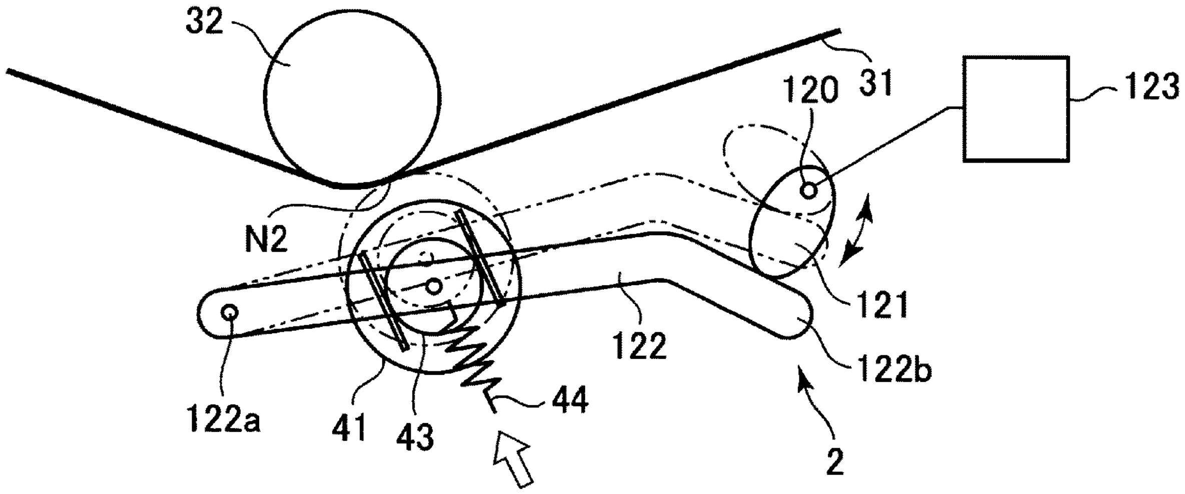
FIG. 7 is a schematic side view showing a contact and separation mechanism.

A contact and separation mechanism 2 for the outer roller 41 in this embodiment will be described. FIG. 7 is a schematic view showing a schematic structure of the contact and separation mechanism 2. In FIG. 7, the structure of one end portion with respect to the rotational axis direction of the inner roller 32 is shown, but the structure of the other end portion is similar thereto (substantially symmetrical therewith with respect to a center of the inner roller 32 in the rotational axis direction of the inner roller 32).

Opposite end portions of the outer roller 41 with respect to the rotational axis direction are rotatably supported by bearings 43. The bearings 43 are supported by a frame or the like of the apparatus main assembly 100*a* so as to be slidably (movable) in a direction toward the inner roller 32 and an opposite direction thereto along a predetermined direction (for example, the direction substantially perpendicular to the above-described reference line L1). The bearings 43 are pressed toward the inner roller 32 by the pressing springs 44 constituted by compression springs which are urging members (elastic members) as urging means. By this, the outer roller 41 contacts the inner roller 32 while nipping the intermediary transfer belt 31 between itself and the inner roller 32 and forms the secondary transfer nip N2.

Further, in this embodiment, the image forming apparatus 100 includes the contact-and-separation mechanism (contact-and-separation means) 2 for moving the outer roller 41 toward and away from the intermediary transfer belt 31. As shown in FIG. 7, the contact-and-separation mechanism 2 is constituted by including a contact-and-separation arm 122, a contact-and-separation cam 121, a contact-and-separation motor 123 and the like. The contact-and-separation arm 122 is supported by the frame or the like of the apparatus main assembly 100*a* so as to be rotatable about a contact-and-separation rotation shaft 122*a* and engages with the bearings 43. Further, the contact-and-separation arm 122 is constituted so as to be rotated by the action of the contact-and-separation cam 121 as an acting member. The contact-and-separation cam 121 is supported by the frame or the like of the apparatus main assembly 100*a* so as to be rotatable about a contact-and-separation cam rotation shaft 120. The contact-and-separation cam 121 is rotatable about the contact-and-separation cam rotation shaft 120 by receiving drive from the contact-and-separation motor 123 as a driving source. Further, the contact-and-separation cam 121 contacts a contact-and-separation cam follower 122*b* provided as a part of the contact-and-separation arm 122. Further, the contact-and-separation arm 122 is urged so as to be rotated by the pressing springs 44 in a direction in which the contact-and-separation cam follower 122*b* engages with the contact-and-separation cam 121.

The contact-and-separation mechanism 2 moves the outer roller 41 in directions in which the outer roller 41 is moved away from and toward the inner roller 32. As shown by a solid line in FIG. 7, when the outer roller 41 is separated from the intermediary transfer belt 31, the contact-and-separation cam 121 is rotated counterclockwise, for example, by being driven by the contact-and-separation motor 123, so that the contact-and-separation arm 122 is rotated clockwise. By this, the contact-and-separation arm 122 moves the bearings 43 in a direction away from the inner roller 32 (downward) against the urging force of the pressing springs 44, so that the outer roller 41 is separated from the intermediary transfer belt 31. On the other hand, as shown by a chain double-dashed line in FIG. 7, when the outer roller 41 is contacted to the intermediary transfer belt 31, the contact-and-separation cam 121 is rotated, for example, clockwise by being driven by the contact-and-separation motor 123, so that the contact-and-separation arm 122 is rotated counterclockwise by the urging force of the pressing springs 44. By this, the contact-and-separation arm 122 moves the bearings 43 in a direction toward the inner roller 32 (upward), so that the outer roller 41 is contacted to the intermediary transfer belt 31.

In this embodiment, the contact-and-separation mechanism 2 separates the outer roller 41 from the intermediary transfer belt 31 in order to avoid deposition of the toner, on the surface of the outer roller 41, which does not transfer onto the recording material S, such as a test image (patch) which is for image density correction or color misregistration correction and which is formed on the intermediary transfer belt 31. Further, the contact-and-separation mechanism 2 separates the outer roller 41 from the intermediary transfer belt 31 also when a jam (paper jam) clearance is carried out. Further, when the outer roller 41 is continuously pressed toward the inner roller 32 after a job (described later) is ended, the inner roller 32 and the controller 41 are deformed in some cases. Therefore, in this embodiment, the contact-and-separation mechanism 2 separates the outer roller 41 from the intermediary transfer belt 31 when the job is ended and the image forming apparatus 100 is in a stand-by state in which the image forming apparatus 100 stands by for a subsequent job. Also, when the image forming apparatus 100 is in a sleep state or in a state in which a main power source is turned OFF, the outer roller 41 is kept at a state in which the outer roller 41 is separated from the intermediary transfer belt 31. Further, after the power source is turned ON, in the case where the job is started, the outer roller 41 shifts in state to a state separated from the intermediary transfer belt 31 or a state contacted to the intermediary transfer belt 41.

Incidentally, the offset mechanism 1 may also be constituted so as to be capable of performing an offset amount X changing operation in either of a state in which the outer roller 41 is contacted to the intermediary transfer belt 31 and a state in which the outer roller 41 is separated from the intermediary transfer belt 31. However, as described specifically later, in this embodiment, in the case where the offset amount X is changed during the mixed job, the outer roller 41 contacts the intermediary transfer belt 31 when the inner roller 32 is moved. Further, the offset mechanism 1 may also be capable of performing the offset amount X changing operation in either of a state in which the intermediary transfer belt 31 is at rest and a state in which the intermediary transfer belt 31 is rotated. However, as described specifically later, in this embodiment, in the case where the offset amount X is changed during the execution of the mixed job, when the inner roller 32 is moved, the intermediary transfer belt 31 rotates at a driving speed (peripheral speed) during normal image formation.

5. Problem and Outline of Constitution of this Embodiment

In the embodiment 1, the operation in the case where the offset amount X is changed during actuation was described. In the image forming apparatus 100, for example, for bookbinding printing or the like, a job for forming images on a plurality of kinds of recording materials S ("mixed job") is executed in some instances. In the mixed job, for example, in order to obtain a good transfer property for each of the plurality of kinds of recording materials S different in rigidity, such as "thin paper" and "thick paper", it is effective to change the offset amount X during the job. However, in this case, in order to move the inner roller 32 or the outer roller 41, when an operation for eliminating a pressing state between the inner roller 32 and the outer roller 41 is performed, a time required for that purpose excessively generates, so that the time causes a large lowering in productivity.

Therefore, in this embodiment, in the case where the offset amount X is changed during execution of the mixed job, an operation (herein, also referred to as "offset operation" or "position changing operation") in which the offset mechanism 1 changes the position of at least one of the inner roller 32 or the outer roller 41 (particularly, the inner roller 32 in this embodiment) in a state in which the outer roller 41 contacts the intermediary transfer belt 31 (i.e., a state in which the secondary transfer nip N2 is formed) is executed.

Incidentally, in the case where an ordinary sheet (paper) interval in a continuous image formation job for recording materials S of the same kind is insufficient in offset operation, the sheet interval is extended sufficiently for the offset operation. Here, the sheet interval is a period after a preceding recording material S passed through the secondary transfer nip N2 and until a recording material S subsequent to the preceding recording material S reaches the secondary transfer nip N2.

6. Control Mode

Figure 8:
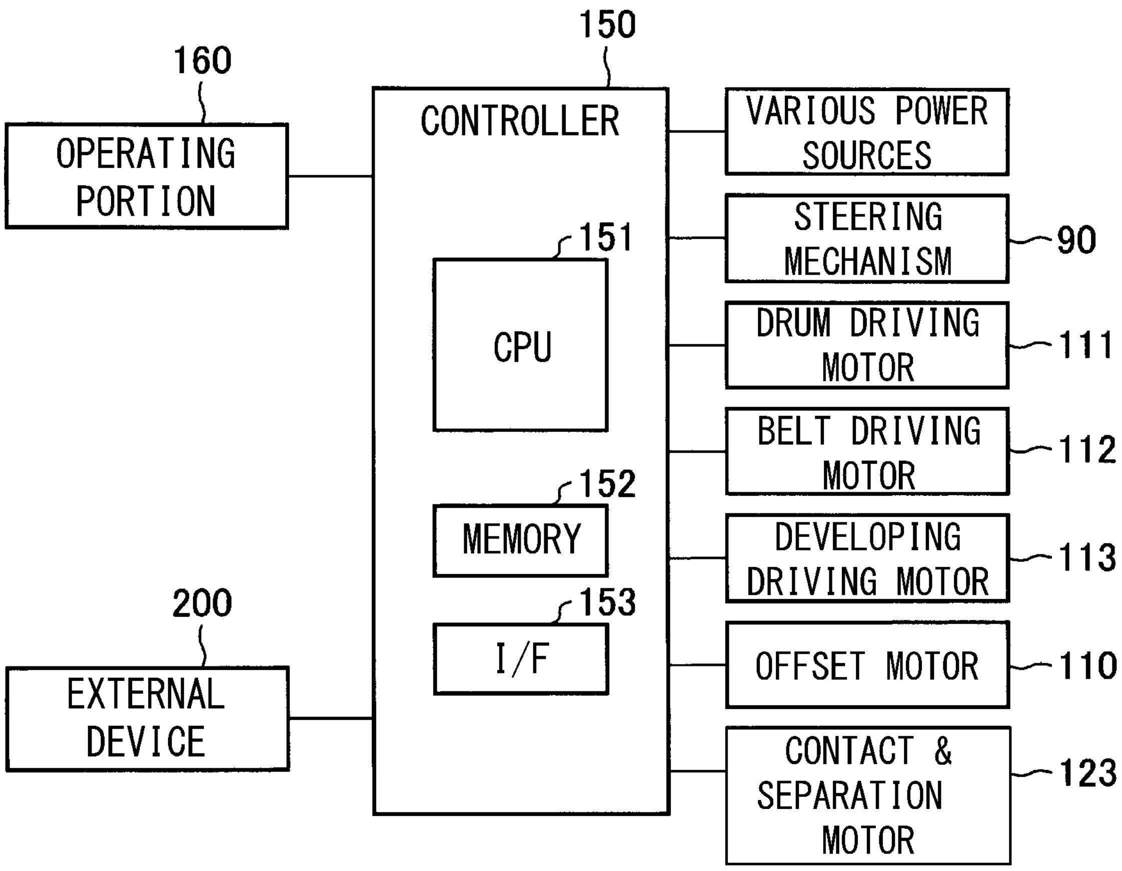
FIG. 8 is a schematic block diagram showing a control mode of a principal part of the image forming apparatus.

FIG. 8 is a schematic block diagram showing a control mode of a principal part of the image forming apparatus 100 of this embodiment. The control portion (controller) 150 as a control means is constituted by including a CPU 151 as a calculation control means, which is a central element for performing a calculation process, memories (storing media 152 such as a ROM and a RAM) as storing means, an interface portion 153, and the like. In the RAM, which is a rewritable memory, information inputted to the controller 150, detected information, a calculation result, and the like are stored, and in the ROM, a control program, data table acquired in advance, and the like are stored. The CPU 151 and the memory 152 are capable of mutual transfer and reading of the data. The interface portion 153 controls input and output (communication) of signals between the controller 150 and equipment connected thereto.

To the controller 150, respective portions (the image forming portion 10, the driving devices for the members relating to feeding of the intermediary transfer belt 31 and the recording material, various power sources, and the like) of the image forming apparatus 100 are connected. In a relation with this embodiment, particularly, to the controller 150, the offset motor 110 which is the driving source of the offset mechanism 1, the contact-and-separation mechanism motor 123 which is the driving source of the contact-and-separation mechanism 2, and the like are connected. Further, to the controller 150, the drum driving motor 111, the belt driving motor 112, the developing motor 113, the steering mechanism 90, the various high-voltage power sources (the charging voltage, the developing voltage, the primary transfer voltage, the secondary transfer voltage), and the like are connected. Further, to the controller 150, an operating portion (operating panel) 160 provided on the image forming apparatus 100 is connected. The operating portion 160 includes a display portion as a display means for displaying information by control of the controller 150, and an input portion as an input means for inputting the information to the controller 150 by an operation by an operator such as a user or a service person. The operating portion 160 may be constituted by including a touch panel having functions of the display portion and the input portion. Further, to the controller 150, an image reading apparatus (not shown) provided in the image forming apparatus 100 or connected to the image forming apparatus 100, and an external device 200 such as a personal computer connected to the image forming apparatus 100 may also be connected.

The controller 150 causes the image forming apparatus 100 to form the image by controlling the respective portions of the image forming apparatus 100 on the basis of information on a job. The job information includes a start instruction (start signal) and information (instruction signal) on an image forming condition such as a kind of the recording material S, which are inputted from the operating portion 160 or the external device 200. Further, the job information includes image information (image signals) inputted from the image reading apparatus or the external device 200. Incidentally, information on the kind of the recording material (also simply referred to as "information on the recording material") encompasses arbitrary pieces of information capable of discriminating the recording material, inclusive of attributes (so-called paper kind categories) based on general features such as plain paper, quality paper, glossy paper, coated paper, embossed paper, thick paper and thin paper, numerals and numerical ranges such as a basis weight, a thickness, a size and rigidity, and brands (including manufacturer, product numbers and the like). In this embodiment, the information on the kind of the recording material S includes information on the kind of the recording material S relating to the rigidity of the recording material S, particularly, as an example, information on the basis weight of the recording material S.

Here, the image forming apparatus 100 executes a job which is a series of operations which is started by a single start instruction and in which the image is formed and outputted on a single recording material S or a plurality of recording materials S. The job includes an image forming step (printing operation, image forming operation), a pre-rotation step, a sheet (paper) interval step in the case where the images are formed on the plurality of recording materials S, and a post-rotation step, in general. The image forming step is a period in which formation of an electrostatic image for the image actually formed and outputted on the recording material S, formation of the toner image, primary transfer of the toner image and secondary transfer of the toner image are carried out, and during image formation (image forming period) refers to this period. Specifically, a timing during the image formation is different between positions where the respective steps of the formation of the electrostatic image, the toner image formation, the primary transfer of the toner image and the secondary transfer of the toner image are performed. The pre-rotation step is a period in which a preparatory operation, before the image forming step, from an input of the start instruction until the image is started to be actually formed, is performed. The sheet interval step is a period corresponding to an interval between a recording material S and a (subsequent) recording material S when the images are continuously formed on the plurality of recording materials S (continuous image formation). The post-rotation step is a period in which a post-operation (preparatory operation) after the image forming step is performed. During non-image formation (non-image formation period) is a period other than during image formation and includes the periods of the pre-rotation step, the sheet interval step, and the post-rotation step, which are described above, and further includes a period of a pre-multi-rotation step, which is a preparatory operation during turning-on of a power source of the image forming apparatus 100 or during restoration from a sleep state. Incidentally, the sleep state (rest state) is, for example, a state in which supply of electric power to the respective portions of the image forming apparatus 100, other than the controller 150 (or a part thereof), is stopped and electric power consumption is made smaller than electric power consumption in the stand-by state. The image forming apparatus 100 enters the sleep state, for example, in the case where the stand-by state continues over a predetermined time or depending on the operation of the operator.

7. Control Procedure

Figure 9:
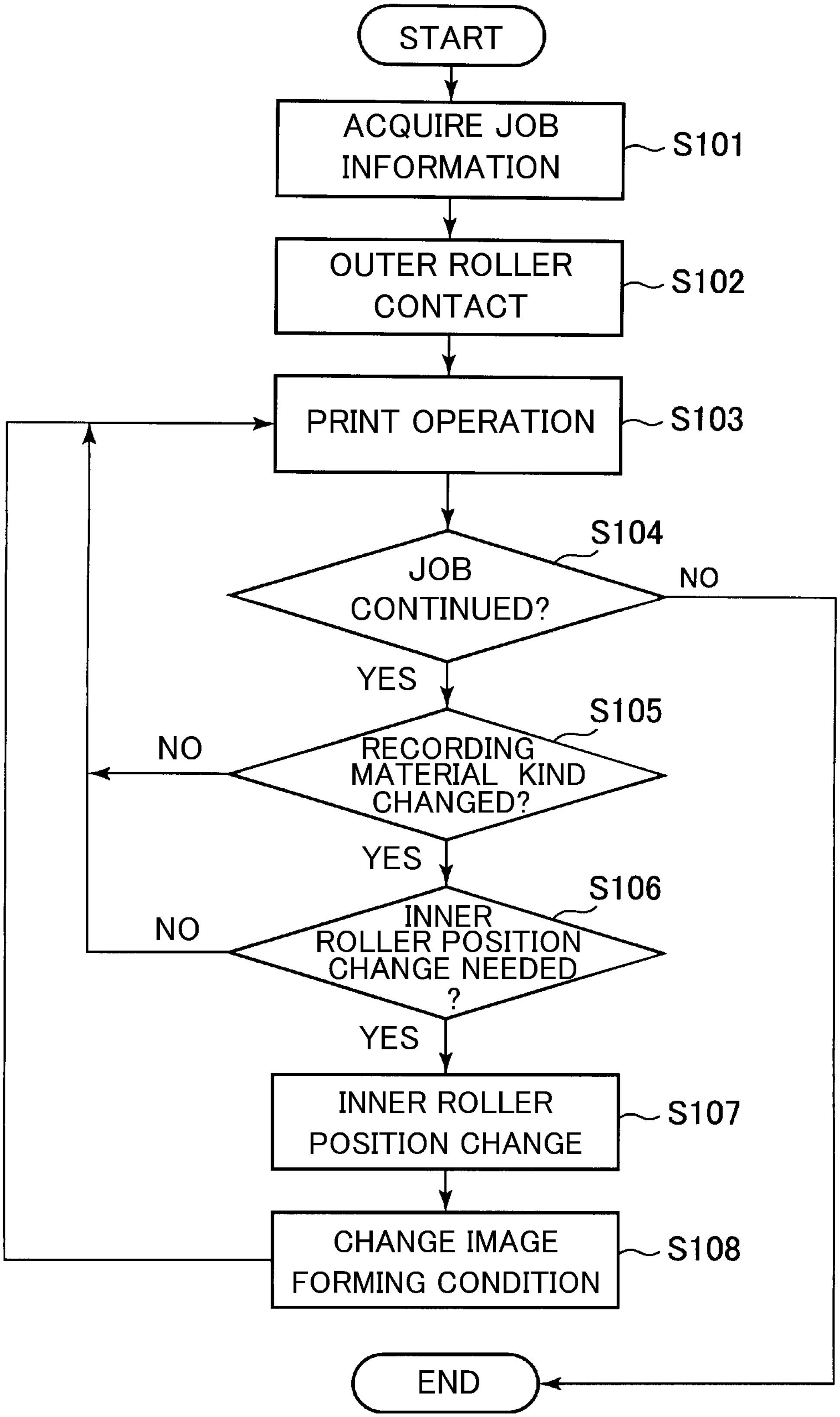
FIG. 9 is a flowchart showing an outline of procedure of an operation of a job.

FIG. 9 is a flowchart (diagram) showing an outline of an example of a control procedure of the job in this embodiment. Herein, the mixed job in which the "thin paper" and the "thick paper" are used as the recording materials S will be described as an example. More specifically, the case where the job is started from a state of a home position and the printing operation for the "thick paper" is executed early and then the recording material S is changed from the "thick paper" to the "thin paper" during the job will be described. However, for example, even in the case where the recording material S is changed from the "thin paper" to the "thick paper" during the job, although positions of the inner roller 32 before and after the offset operation are different from each other, a procedure is similar to a procedure described in the following. Further, herein, the case where the operator causes the image forming apparatus 100 to execute the job from the external device 200 will be described as an example. Incidentally, in FIG. 9, the outline of the control procedure in which attention is paid to the offset operation is shown, and many other operations ordinarily needed for outputting the images by executing the job are omitted.

First, to the controller 150, job information (image information, information on an image forming condition, start instruction) is inputted from the external device 200 (S101). When the job information is inputted, the controller 150 acquires information on the kind of the recording material S for each page included in the job information. In this embodiment, the information on the kind of the recording material S includes at least information of a basis weight of the recording material S. Incidentally, the controller 150 is capable of acquiring the information on the kind of the recording material S directly inputted (including selection from a plurality of choices) from the external device 200 (or the operating portion 160) by the operation of the operator. Further, the controller 150 can also acquire the information on the kind of the recording material S on the basis of information, on recording material cassettes 61, 62 and 63 for feeding the recording materials S in the job, inputted from the external device 200 (or the operating portion 160) through the operation by the operator. In this case, the controller 150 is capable of acquiring the information on the kind of the recording material S from the information on the kind of the recording materials accommodated in respective cassettes 61, 62 and 63 stored in the memory 152 in association with the cassettes 61, 62 and 63 in advance. Here, when the information on the kind of the recording material S is registered, the associated information may also be selected from a list of kinds of the recording materials S stored in advance in the memory 152 or in a storing device connected to the controller 150 through a network.

Then, the controller 150 sends a control signal to the contact and separation mechanism 2 (more specifically, the contact and separation motor 123) and causes the contact and separation mechanism 2 to bring the outer roller 41 into contact with the intermediary transfer belt 31, so that preparation for the printing operation is made (S102). Next, the controller 150 sends an image forming signal to the respective image forming portions 10 and the like on the basis of the job information and causes the portions to execute the printing operation (S103). The controller 150 discriminates whether or not the job is continued for one page (S104). In the case where the controller 150 discriminated in S104 that the job is not continued, the job is ended. On the other hand, in the case where the controller 150 discriminated in S104 that the job is continued, in the printing operation for a next page, the controller 150 discriminates whether or not change in kind of the recording material S is made from the printing operation for the last page (S105). In the case where the controller 150 discriminated in S105 that the change in kind of the recording material is not made, the sequence goes to the process of S103, and the printing operation for the next page is executed. On the other hand, in the case where the controller 150 discriminated in S105 that the change in kind of the recording material S is made, the controller 150 discriminates whether or not the change in position of the inner roller 32 is needed (S106). That is, the controller 150 discriminates whether or not the change in position of the inner roller 32 is needed from a current position of the inner roller 32 and a position of the inner roller 32 corresponding to the kind of the recording material S after the change. Herein, the case where the job is started from a state of the home position corresponding to the "thick paper" and the printing operation for the "thick paper" is executed early, and then the recording material S is switched from the "thick paper" to the "thin paper" during the job is taken as an example. For that reason, in the case where the recording material S for a next page is the "thin paper", discrimination that the change in position of the inner roller 32 is needed is made. The outer roller 150 is capable of acquiring the information of the current position of the inner roller 32, for example, every time when the position of the inner roller 32 is changed, from information indicating the position of the inner roller 32 stored in the memory 152, information as to whether or not the image forming apparatus enters the sleep state, or the like. Incidentally, more specifically, the controller 150 may also determine the position of the inner roller 32 for each page in the following manner. That is, information on a predetermined threshold of the basis weight of the recording material S (as an example, 52 g/$m^2$ described above) is stored in the memory 152. Then, during the printing operation for the recording material S with a basis weight of not less than the threshold, the controller 150 determines the position of the inner roller 32 at a first inner roller position where the offset amount X is a first offset amount X1 which is relatively small. Further, during the printing operation for the recording material S with a basis weight of less than the threshold, the controller 150 determines the position of the inner roller 32 at a second inner roller position where the offset amount X is a second offset amount X2 which is relatively large. Incidentally, as described above, in the case where the position of the inner roller 32 in three or more patterns is set, information on a plurality of thresholds may be set so as to define a basis weight range corresponding to each of the patterns.

In the case where the controller 150 discriminated in S106 that there is no need to change the position of the inner roller 32, the sequence goes to the process of S103, and the printing operation for a next page is executed. On the other hand, in the case where the controller 150 discriminated in S106 that the change in position of the inner roller 32 is needed, the offset amount X is changed by changing the position of the inner roller 32 in a sheet interval between a prior page and a page subsequent to the prior page. That is, the controller 150 sends a control signal to the offset mechanism 1 (more specifically, the offset motor 110) and causes the offset mechanism 1 to change the position of the inner roller 32 (S107). At this time, there is a need to complete the change in position of the inner roller 32 in a period from passing of the prior recording material S ("thin paper") through the secondary transfer nip N2 until the subsequent recording material S ("thin paper") through the secondary transfer nip N2 until the subsequent recording material S ("thick paper") reaches the secondary transfer nip N2. In the case where it is impossible to complete this operation in the ordinary sheet interval, the controller 150 extends the sheet interval. Specifically, the controller 150 is capable of adjusting the sheet interval by controlling a feeding timing of the subsequent recording material S and an image forming timing. Next, in the case where there is a need to change the image forming condition to an image forming condition such as a high-voltage condition due to the change in recording material S, the controller 150 makes the change in image forming condition thereof (S108). By this, an image formable state is formed, and therefore, the sequence returns to the process of S103, and the controller 150 causes the image forming apparatus 100 to execute the printing operation for the next page.

Here, in this embodiment, the printing operation for the subsequent (next) page includes an operation in which the latent image is formed on the photosensitive drum 11 in order to form an image for the next page. In the case where there is a need to change the position of the inner roller 32 in the sheet interval step between the prior page and the page subsequent to the prior page (S107), the printing operation for the next page (formation of the latent image on the photosensitive drum 1 for the purpose of forming the image on the next page) is started after the position change of the inner roller is completed. This is because there is a liability that a surface speed of the intermediary transfer belt 31 is disturbed by the movement of the inner roller 32, with the result that there is a possibility that image disturbance in the primary transfer nip N1 occurs.

However, in the case where the influence on the surface speed of the intermediary transfer belt 31 by the position change of the inner roller 32 is small, the formation of the latent image on the photosensitive drum 1 for image formation for the next page may be started during the position change of the inner roller 32. However, from a viewpoint of an image quality, at least a period in which the image on the next page is primary-transferred in the primary transfer nip N1 may preferably be constituted so that the change in position of the inner roller 32 is not made.

Incidentally, in this embodiment, when the job is ended and the image forming apparatus 100 is in a stand-by state in which the image forming apparatus 100 stands by for a next job, the controller 150 sends a control signal to the contact and separation mechanism 2 and causes the contact and separation mechanism 2 to separate the outer roller 41 from the intermediary transfer belt 31. At this time, the contact and separation mechanism 2 starts an operation for separating the outer roller 41 from the intermediary transfer belt 31 (separating operation) on or after a time when a final recording material S of the job ends passing though the secondary transfer nip N2. Further, in this embodiment, when the job is ended and the image forming apparatus 100 is in the stand-by state in which the image forming apparatus 100 stands by for a subsequent job, the controller 150 sends a control signal to the contact and separation mechanism 2 and causes the contact and separation mechanism 2 to separate the outer roller 41 from the intermediary transfer belt 31. Further, in this embodiment, when the offset mechanism 1 moves the inner roller 32 to the home position, the movement is carried out in a state in which the outer roller 41 is separated from the intermediary transfer belt 31. Further, with an end of the job, in the case where the outer roller 41 is separated from the intermediary transfer belt 31, the controller 150 may execute the separating operation during the post-rotation operation.

Further, in this embodiment, a constitution, in which, with the end of the job, the outer roller 41 is separated from the intermediary transfer belt 31 during the stand-by state, is employed. On the other hand, in the case where an instruction of a subsequent job is received before transition to the stand-by state, the subsequent job may be started without separating the outer roller 41 from the intermediary transfer belt 31.

Further, in this embodiment, during the job, in the sheet interval period that corresponds to the interval between a recording material and a (subsequent) recording material, the controller 150 controls the contact and separation mechanism 2 so that a state in which the outer roller 41 contacts the intermediary transfer belt 31 is maintained.

8. Effect

As described above, in this embodiment, the offset amount X is changed in the sheet interval step during execution of the mixed job. That is, in this embodiment, a relative position between the inner roller 32 and the outer roller 41 with respect to a circumferential direction of the inner roller 32 is changed in a period (sheet interval) after passing of the prior recording material S through the secondary transfer nip N2 until the subsequent recording material S reaches the secondary transfer nip N2 during execution of the job forming and outputting the images on a plurality of recording materials S. By this, the shape of the secondary transfer nip N2 (the position of the secondary transfer nip N2) is changed. Further, in this embodiment, in this case, the outer roller 41 contacts the intermediary transfer belt 31 (i.e., forms the secondary transfer nip N2) when the inner roller 32 is moved. Thus, the change in position of the inner roller 32 is made while the inner roller 32 and the outer roller 41 are put in a pressing state which is the same as the pressing state provided during the image formation. By this, an excessive time other than a time required for the change in position of the inner roller 32 is not taken, and therefore, it becomes possible to suppress a lowering in productivity. Accordingly, according to this embodiment, it is possible to improve a transfer property of the image onto each of the recording materials S of the plurality of kinds in the mixed job while suppressing the lowering in productivity by suppressing generation of down-time (period in which the image cannot be outputted).

Embodiment 2

Next, another embodiment of the present invention will be described. Basic constitutions and operations of an image forming apparatus in this embodiment are the same as those of the image forming apparatus in the embodiment 1. Accordingly, elements having the same or corresponding functions or constitutions as those in the image forming apparatus of the embodiment 1 are represented by the same reference numerals or symbols as those in the embodiment 1 and will be omitted from detailed description.

In the embodiment 1, in the case where the offset amount X is changed during execution of the mixed job, when the inner roller 32 is moved, the intermediary transfer belt 31 was rotated at a driving speed (peripheral speed) during normal image formation.

However, the inner roller 32 moved in the offset operation is one of the plurality of rollers stretching the intermediary transfer belt 31, and therefore, the movement of the inner roller 32 has the influence on the travelling of the intermediary transfer belt 31 in some cases. For example, in the case where the surface speed of the intermediary transfer belt 31 is disturbed by the movement of the inner roller 32, there is a possibility of an occurrence of disturbance of the image in the primary transfer nip N1. Further, in the case where the shift control of the intermediary transfer belt 31 is carried out as described above, a change in shift amount is increased by the movement of the inner roller 32 in some instances. Further, when the image formation is carried out, there is a possibility that image defect such as color misregistration is caused to occur, for example. For that reason, in the case where the offset amount X is changed during execution of the mixed job, when the inner roller 32 is moved, the intermediary transfer belt 31 may desirably be reduced in speed to a driving speed (second speed) smaller than a driving speed (first speed) during the normal image formation or may desirably be at rest in some cases.

The influence on the disturbance of the surface speed and the shift control is proportional to the travelling distance of the intermediary transfer belt 31. For that reason, a travelling distance per unit time is made short by slowing the driving speed of the intermediary transfer belt 31, so that it is possible to dull the influence on the disturbance of the surface speed and the shift control when the inner roller 32 is moved during the travelling of the intermediary transfer belt 31. The driving speed after the reduction can be appropriately set depending on a drive control characteristic of the intermediary transfer belt 31, a time required for the position change of the inner roller 32, or the influence on the disturbance of the surface speed and the shift control. Although the present invention is not limited to this, from a viewpoint of suppressing the influence on the disturbance of the surface speed and the shift control, the driving speed after the reduction in speed may suitably be about ½ or less of the driving speed during the normal image formation, and the intermediary transfer belt 31 may be at rest. However, from a viewpoint of reducing a time required for returning the driving speed, the driving speed of the intermediary transfer belt 31 after reduction in speed may suitably be about ⅕ or more of the driving speed of the intermediary transfer belt 31 during the normal image formation. For example, in this embodiment, the driving speed (first speed) of the intermediary transfer belt 31 during the normal image formation is 400 mm/sec. Further, in the case where the offset amount X is changed during execution of the mixed job, for example, the driving speed (second speed) of the intermediary transfer belt 31 when the inner roller 32 is moved can be reduced to 200 mm/sec which is half thereof (400 mm/sec), or can be stopped.

Figure 10:
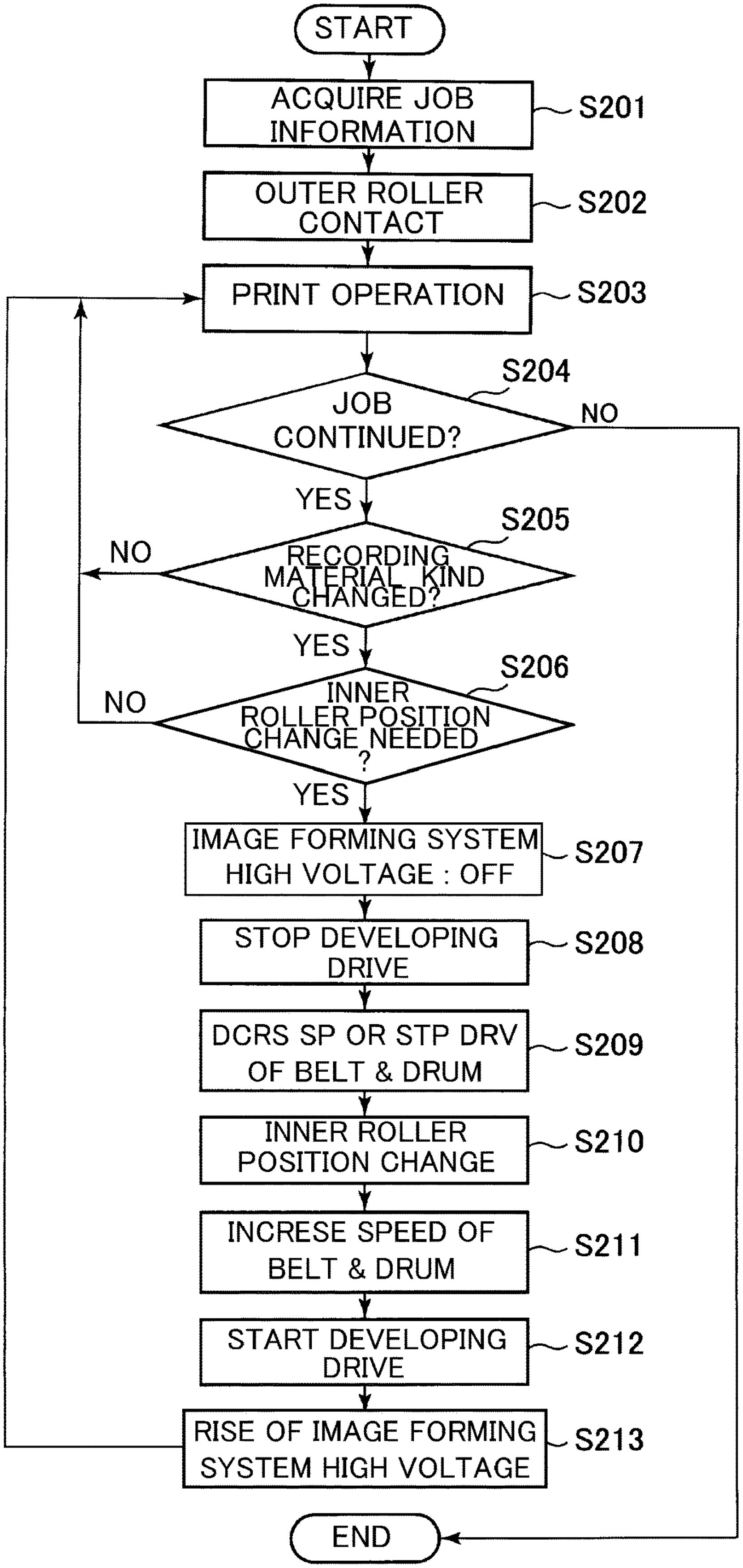
FIG. 10 is a flowchart showing another example of the procedure of the operation of a job.

FIG. 10 is a flowchart showing an outline of an example of a control procedure of a job in this embodiment. Similarly as in the procedure of FIG. 9 described in the embodiment 1, herein the case where the job is started from a state of the home position and the printing operation for the "thick paper" is executed early and then the recording material S is changed from the "thick paper" to the "thin paper" during the job will be described. Processes similar to the processes in the procedure of FIG. 9 described in the embodiment 1 will be appropriately omitted from description.

The processes S201 to S206 of FIG. 10 are the same as the processes S101 to S106 of FIG. 9. Next, as preparation for the offset operation, the controller 150 first sends control signals to various high-voltage power sources (the charging voltage, the developing voltage, the primary transfer voltage, the secondary transfer voltage) for the image forming system such as the respective image forming portions 10 and the like, and causes the power sources to turn all the high voltages, inputted to the image forming system, OFF (S207). Then, the controller 150 sends a control signal to the developing motor 113 and causes the developing motor to stop the drive of the developing motor of the developing device 14 (S208). Then, the controller 150 sends a control signals to the belt driving motor 112 and the drum driving motor 111 and causes these motors to lower the driving speeds of the intermediary transfer belt 31 and the photosensitive drum 11 to half speeds of those during the normal image formation, or to stop the drive of the intermediary transfer belt 31 and the photosensitive drum 11 (S209). Then, after the driving speeds of the intermediary transfer belt 31 and the photosensitive drum 11 are reduced to the above-described half speeds or after the rotation of the intermediary transfer belt 31 or the photosensitive drum 11 is stopped, the controller 150 sends a control signal to the offset mechanism 1 (more specifically, the offset motor 110) and causes the offset mechanism 1 to change the positions of the inner roller 32 (S210).

After the position of the inner roller 32 is changed, the operation is restored to the printing operation in a reverse procedure to the above-described procedure before the change. That is, the controller 150 sends control signals to the drum driving motor 111 and the belt driving motor 112 and causes these motors to increase the driving speeds of the photosensitive drum 11 and the intermediary transfer belt 31 to driving speeds during the normal image formation (S211). At this time, in the case where the drive of the photosensitive drum 11 and the drive of the intermediary transfer belt 31 are stopped in S209, the controller 150 causes the motors to start the drive of the photosensitive drum 11 and the drive of the intermediary transfer belt 31 and to increase the driving speeds of the photosensitive drum 11 and the intermediary transfer belt 31 to the driving speeds during the normal image formation. Then, the controller 150 sends control signal to the developing motor 113 and causes the developing motor to start the drive of the developing motor of the developing device 14 (S212). Then, the controller 150 sends control signals to the various high-voltage power sources (the charging voltage, the developing voltage, the primary transfer voltage, the secondary transfer voltage) for the image forming system such as the respective image forming portions 10 and the like and causes the power sources to apply high voltages inputted to the image forming system (S213). At this time, in the case where there is a need to change the image forming condition to an image forming condition such as a high-voltage condition due to the change in recording material S, the controller 150 makes the change in image forming condition thereof. By this, an image formable state is formed, and therefore, the sequence returns to the process of S103, and the controller 150 causes the image forming apparatus 100 to execute the printing operation for the next page.

Thus, in this embodiment, in the case where the offset amount X is changed during the execution of the mixed job, the belt driving motor 112 changes the driving speed of the intermediary transfer belt 31 from the first speed when the transfer is carried out to the second speed smaller than the first speed, and then the offset mechanism 1 performs the offset operation. Then, after the offset mechanism 1 performs the offset operation, the belt driving motor 112 changes the driving speed of the intermediary transfer belt 31 from the above-described second speed to the above-described first speed. Or, in this embodiment, in the case where the offset amount X is changed during the execution of the mixed job, the belt driving motor 112 stops the drive of the intermediary transfer belt 31, and then the offset mechanism 1 performs the offset operation. Then, after the offset mechanism 1 performs the offset operation, the belt driving motor 112 starts the drive of the intermediary transfer belt 31.

Here, execution of the offset operation after the driving speed of the intermediary transfer belt 31 is changed more specifically means that the offset mechanism 1 starts the offset operation on or after the time when the driving speed of the intermediary transfer belt 31 reaches the above-described second speed (certain speed after the change). Typically, the start of the offset operation is later than arrival at the above-described second speed, but the arrival at the above-described second speed and the start of the offset operation may also be substantially at the same time. A timing when the driving speed reaches the above-described second speed can be discriminated on the basis of other than a timing when the driving speed of the intermediary transfer belt 31 actually reaches the above-described second speed, a timing when the driving signal inputted from the controller 150 to the belt driving device 112 changes or the like. A timing when the offset operation is started can be discriminated on the basis of other than a timing when the movement of the inner roller 32 or the outer roller 41 is actually started, a timing when the input of the driving signal from the controller 150 to the offset mechanism 1 (more specifically, the offset motor 110) is started, a timing when the drive start signal is inputted from the controller 150 to the offset mechanism 1, or the like.

Further, execution of the change in driving speed of the intermediary transfer belt 31 after the offset operation is executed more specifically means that the belt driving motor 112 starts the change in driving speed of the intermediary transfer belt 31 from the above-described second speed to the above-described first speed on or after the time when the offset mechanism 1 completes the offset operation. Typically, the start of the change in driving speed is later than the completion of the offset operation, but the completion of the offset operation and the start of the change in driving speed may also be substantially at the same time. A timing when the offset operation is completed can be discriminated on the basis of other than a timing when the movement of the inner roller 32 or the outer roller 41 is actually ended, a timing when the input of the driving signal from the controller 150 to the offset mechanism 1 is stopped, a timing when the drive stop signal is inputted from the controller 150 to the offset mechanism 1, or the like. Further, a start timing of the change in driving speed can be discriminated on the basis of other than a timing when the driving speed of the intermediary transfer belt 31 actually starts to change, a timing when the driving signal inputted from the controller 150 to the belt driving device 112 changes, or the like.

Similarly, execution of the offset operation after the stop of the drive of intermediary transfer belt 31 is changed more specifically means that the offset mechanism 1 starts the offset operation on or after the time when the rotation of the intermediary transfer belt 31 is stopped. Typically, the start of the offset operation is later than the stop of the rotation of the intermediary transfer belt 31, but the stop of the rotation of the intermediary transfer belt 31 and the start of the offset operation may also be substantially at the same time. A timing when the rotation of the intermediary transfer belt 31 is stopped can be discriminated on the basis of other than a timing when the intermediary transfer belt 31 is actually at rest, a timing when the input of the driving signal from the controller 150 to the belt driving device 112 is stopped, a timing when the drive stop signal from the controller 150 to the belt driving motor 112 is inputted, or the like. Further, a timing when the offset operation is started can be discriminated as described above.

Further, execution of the start of the drive of the intermediary transfer belt 31 after the offset operation is executed more specifically means that the rotation of the intermediary transfer belt 31 starts on or after the time when the offset mechanism 1 completes the offset operation. Typically, the start of the rotation of the intermediary transfer belt 31 is later than the completion of the offset operation, but the completion of the offset operation and the start of the rotation of the intermediary transfer belt 31 may also be substantially at the same time. A timing when the offset operation is completed can be discriminated as described above. Further, a timing when the rotation of the intermediary transfer belt 31 starts can be discriminated on the basis of other than a timing when the intermediary transfer belt 31 actually starts to rotate, a timing when the input of the driving signal from the controller 150 to the belt driving device 112 starts, a timing when the drive start signal from the controller 150 to the belt driving motor 112 is inputted, or the like.

As described above, according to this embodiment, it is possible to suppress that the surface speed of the intermediary transfer belt is disturbed by the change in position of the inner roller 32 and that the change in shift amount is made large by the change in position of the inner roller 32. Further, according to this embodiment, although it takes time correspondingly to the change in driving time of the intermediary transfer belt 31 when compared with the embodiment 1, a lowering in productivity can be suppressed when compared with the case where the inner roller 41 is separated from the intermediary transfer belt 41 and then the offset operation is executed. Accordingly, according to this embodiment, similarly as in the embodiment 1, it is possible to improve a transfer property of the image onto each of the recording materials S of the plurality of kinds in the mixed job while suppressing the lowering in productivity.

Embodiment 3

Next, another embodiment of the present invention will be described. Basic constitutions and operations of an image forming apparatus in this embodiment are the same as those of the image forming apparatus in the embodiment 1. Accordingly, elements having the same or corresponding functions or constitutions as those in the image forming apparatus of the embodiment 1 are represented by the same reference numerals or symbols as those in the embodiment 1 and will be omitted from detailed description.

In the embodiment 1, the case where the offset amount X is changed by changing the position of the inner roller 32 was described. In this embodiment, the case where the offset amount X is changed by changing the position of the outer roller 41 will be described. In the embodiment 1, the outer roller 41 may only be required to be moved relative to the inner roller 32 toward a downstream side with respect to the rotational direction of the intermediary transfer belt 31 correspondingly to movement of the inner roller 32 relative to the outer roller 41 toward an upstream side with respect to the rotational direction of the intermediary transfer belt 31 in the case of the "thick paper". Similarly, in the embodiment 1, the outer roller 41 may only be required to be moved relative to the inner roller 32 toward the upstream side with respect to the rotational direction of the intermediary transfer belt 31 correspondingly to movement of the inner roller 32 relative to the outer roller 41 toward the downstream side with respect to the rotational direction of the intermediary transfer belt 31 in the case of the "thin paper". The shape of the secondary transfer nip N2 (the position of the secondary transfer nip N2) formed by the inner roller 32 and the outer roller 41 is similar to the shape in the embodiment 1, so that an effect similar to the effect described in the embodiment 1 can be obtained.

Figure 11:
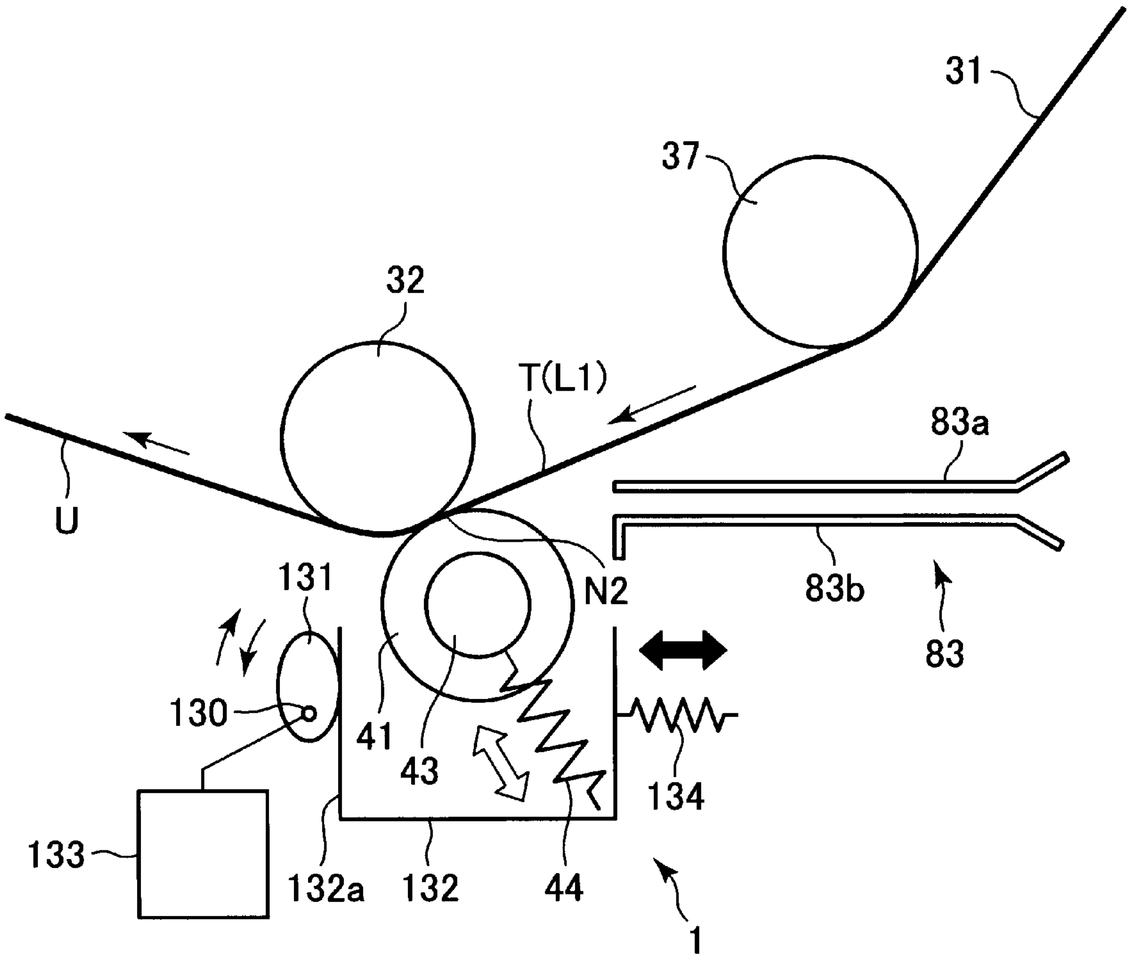
FIG. 11 is a schematic side view showing an offset operation in another embodiment.

FIG. 11 is a schematic side view of a principal part of the neighborhood of the secondary transfer nip N2 in this embodiment as viewed substantially parallel to the rotational axis direction from one end portion side (the front side of the photosensitive drum surface of FIG. 1) with respect to the rotational axis direction of the inner roller 32. In FIG. 11, a structure of the inner roller 32 at one end portion with respect to the rotational axis direction is shown, but a structure of the inner roller 32 at the other end portion is also similar to the structure of the inner roller 32 at the one end portion (these structures are substantially symmetrical with respect to a center of the rotational axis direction of the inner roller 32). In this embodiment, the outer roller 41 is slidably movable in a direction toward the inner roller 32 and an opposite direction thereto (white arrow direction in FIG. 11) along a predetermined first direction (for example, a direction substantially perpendicular to the above-described reference line L1) similarly as in the embodiment 1. Further, in this embodiment, the outer roller 41 is slidably movable in a direction toward a downstream side with respect to the feeding direction of the recording material S and an opposite direction thereto (black arrow direction in FIG. 11) along a predetermined second direction (for example, a direction substantially parallel to the above-described reference line L1) crossing the first direction independently of the above-described first direction.

In this embodiment, a supporting member 132 for supporting the bearings 43 of the above-described outer roller 41 so as to be slidably movable along the above-described first direction is supported by the frame or the like of the apparatus main assembly 100*a* so as to be slidably movable in the above-described second direction. Further, the supporting member 132 is constituted so as to be slidably movable by the action of the offset cam 131 as an acting member. The offset cam 131 is supported by the frame or the like of the apparatus main assembly so as to be rotatable about an offset cam rotation shaft 130. The offset cam 131 is rotatable about the offset cam rotation shaft 130 by receiving drive from an offset motor 133 as a driving source. Further, the offset cam 131 contacts an offset cam follower 132*a* provided as a part of the supporting member 132. Further, the supporting member 132 is urged by an offset spring 134 constituted by a compression spring which is an urging member (elastic member) as an urging means so that the offset cam follower 132*a* is slidably moved in a direction in which the offset cam follower engages with the offset cam 131. Thus, in this embodiment, the offset mechanism 1 is constituted by including the supporting member 134, the offset cam 131, the offset motor 133, the offset spring 134, and the like.

In the case of the "thick paper", the offset cam 131 is driven by the offset motor 133 and is rotated counterclockwise, for example. Then, the supporting member 132 is slidably moved by an urging force of the offset spring 134 in a direction toward the downstream side of the feeding direction of the recording material S, so that a relative position of the outer roller 41 to the inner roller 32 is determined. By this, a state in which the outer roller 41 is disposed in a first outer roller position where the offset amount X is a first offset amount X1 which is relatively small is formed. As a result, as described in the embodiment 1, a lowering in image quality at the trailing end portion of the "thick paper" with respect to the feeding direction can be suppressed. Further, in the case of the "thin paper", the offset cam 131 is driven by the offset motor 133 and is rotated clockwise, for example. Then, the supporting member 132 is slidably moved against the urging force of the offset spring 134 in a direction toward the upstream side of the feeding direction of the recording material S, so that a relative position of the outer roller 41 to the inner roller 32 is determined. By this, a state in which the outer roller 41 is disposed in a second outer roller position where the offset amount X is a second offset amount X2 which is relatively large is formed. As a result, as described in the embodiment 1, a separating property of the "thin paper" from the intermediary transfer belt 31 after having passed through the secondary transfer nip N2 is improved.

Incidentally, also, in this embodiment, the contact and separation mechanism 2 has a constitution similar to the constitution of the embodiment 1. Further, the constitution of this embodiment is also applicable to the operation described in either of the embodiment 1 and the embodiment 2.

As described above, also, by the constitution of this embodiment, effects similar to the effects of the embodiments 1 and 2 can be obtained. However, in this embodiment, there is a need that the outer roller 41 is made movable in the two directions, and therefore, it can be said that when compared with the constitution of this embodiment, the constitution of the embodiment 1 is advantageous in simplification of the constitution of the apparatus and downsizing of the apparatus.

Embodiment 4

Next, another embodiment of the present invention will be described. Basic constitutions and operations of an image forming apparatus in this embodiment are the same as those of the image forming apparatus in the embodiment 1. Accordingly, elements having the same or corresponding functions or constitutions as those in the image forming apparatus of the embodiment 1 are represented by the same reference numerals or symbols as those in the embodiment 1 and will be omitted from detailed description.

In the embodiment 1, as the outer member forming the secondary transfer nip N2 in combination with the inner roller 32 as the inner member, the outer roller 41 directly contacting the outer peripheral surface of the intermediary transfer belt 31 was used. On the other hand, in this embodiment, as the outer member, and outer roller and a secondary transfer belt stretched by the outer roller and another roller are used.

Figure 12:
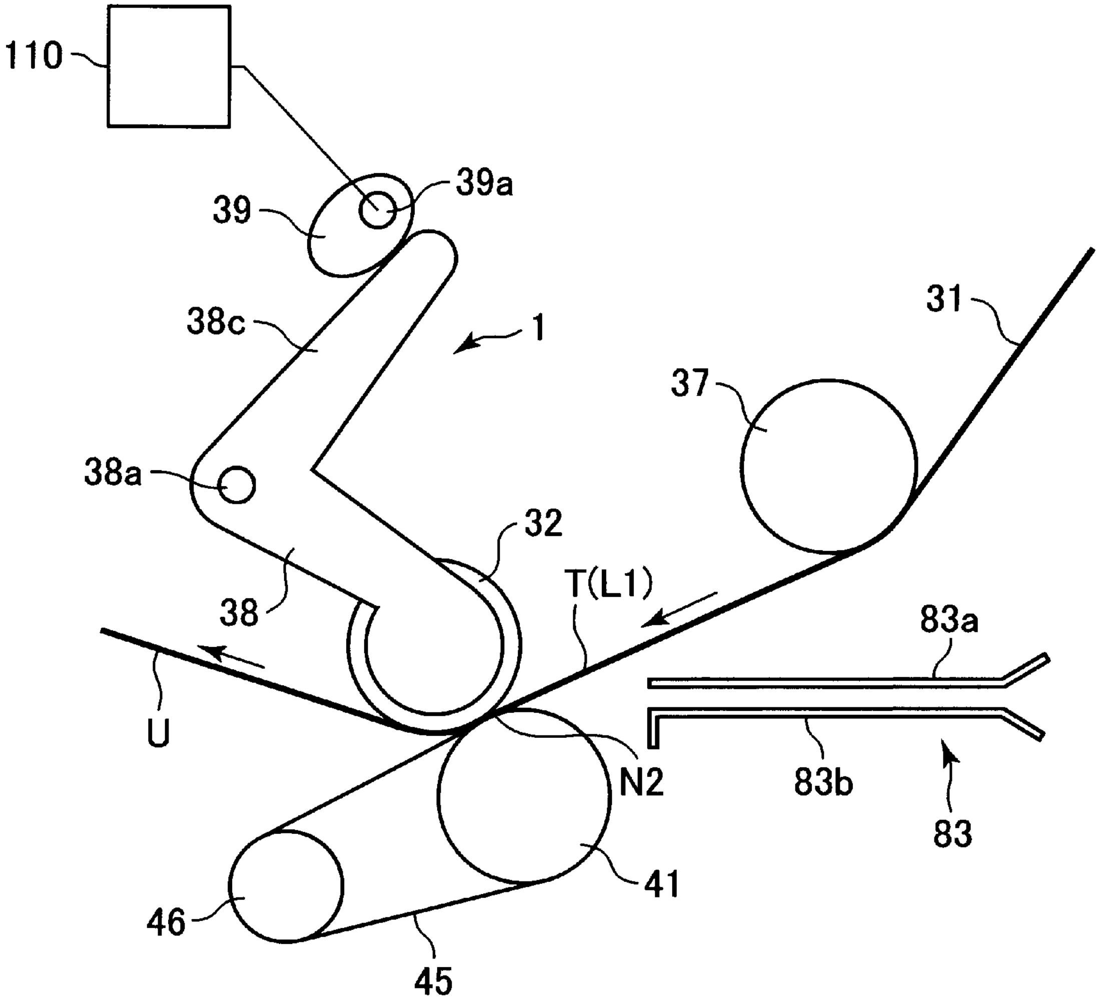
FIG. 12 is a schematic side view showing another example of an outer member.

FIG. 12 is a schematic side view of a principal part of the neighborhood of the secondary transfer nip N2 in this embodiment as viewed substantially parallel to the rotational axis direction from one end portion side (the front side of the paper surface of FIG. 1) with respect to the rotational axis direction of the inner roller 32. In this embodiment, the image forming apparatus 100 includes, as the outer member, a stretching roller 46, the outer roller 41, and a secondary transfer belt 45 stretched between these rollers. Then, the outer roller 41 contacts the outer peripheral surface through the secondary transfer belt 45. That is, the secondary transfer nip N2 is formed by nipping the intermediary transfer belt 31 and the secondary transfer belt 45 by the inner roller 32 contacting the inner peripheral surface of the intermediary transfer belt 31 and the outer roller 41 contacting the inner peripheral surface of the secondary transfer belt 45. In this embodiment, a contact portion between the intermediary transfer belt 31 and the secondary transfer belt 45 is the secondary transfer nip N2 as the secondary transfer portion.

Incidentally, also, in this embodiment, the offset amount X is defined by a relative position between the inner roller 32 and the outer roller 41 similarly as in the embodiment 1. Further, also, in this embodiment, the contact and separation mechanism 2 has a constitution similar to the constitution in the embodiment 1. In this embodiment, the contact and separation mechanism 2 brings the secondary transfer belt 45 into separation from and contact with the intermediary transfer belt 31 by moving the outer roller 41 relative to the inner roller 32 in a separating direction and an approaching direction similarly as in the embodiment 1. Further, the constitution of this embodiment can also be applied to the operation described in either of the embodiment 1 and the embodiment 2. Further, also, in the case where the outer roller and the secondary transfer belt stretched by the outer roller and another roller are used as in this embodiment, the offset amount X can be changed by changing the position of the outer member relative to the inner roller 32 similarly as in the embodiment 3.

As described above, also, by the constitution of this embodiment, effects similar to the effects of the embodiments 1 and 2 can be obtained. Further, in this embodiment, improvement in feeding property of the recording material S passing through the secondary transfer nip N2 can be realized.

Others

In the above, the present invention was described in accordance with the specific embodiments, but the present invention is not limited to the above-described embodiments.

In the above-described embodiments, the information of the basis weight of the recording material was used as the information on the kind of the recording material relating to the rigidity of the recording material, but the present invention is not limited to this. In the case where the paper kind category (for example, paper kind category based on a surface property of plain paper, coated paper, or the like) or the brand (including manufacturer, product number, and the like) is the same, the basis weight of the recording material and the thickness of the recording material are in a substantially proportional relationship in many instances (in which the basis weight is larger with a larger thickness). Further, in the case where the paper kind category or the brand is the same, the rigidity of the recording material, and the basis weight or the thickness of the recording material are in a substantially proportional relationship in many instances (in which the rigidity is larger with a larger basis weight or thickness). Accordingly, for example, the offset amount can be set on the basis of the basis weight, the thickness, or the rigidity of the recording material for each of the paper kind categories, the brands or combinations of the paper kind category and the brand. Further, the controller is capable of operating the offset mechanism so as to provide an offset amount depending on the recording material, on the basis of the information on the paper kind category, the brand, or the like, and the information on the basis weight, the thickness, the rigidity, or the like of the recording material, which are inputted from the operating portion or the external device. Further, as the information on the kind of the recording material, the information is not limited to, for example, use of quantitative information such as the basis weight, the thickness, or the rigidity. As the information on the kind of the recording material, it is also possible to use qualitative information such as the paper kind category, the brand, or the combination of the paper kind category and the brand, for example. For example, the offset amount is set depending on the paper kind category, the brand, or the combination of the paper kind category and the brand, and then the offset amount can be determined depending on the information on the paper kind category, the brand, and the like, which are inputted from the operating portion, the external device, or the like by the controller. Also, in this case, on the basis of a difference in rigidity between the respective recording materials, the offset amount is assigned. Incidentally, the rigidity of the recording material can be represented by Gurley rigidity (stiffness) (MD/long fold) [mN] and can be measured by a commercially available Gurley stiffness tester. For example, the Gurley stiffness (MD) which is an example of the "thin paper" as the recording material of less than 52 g/m$^2$ which is the threshold of the basis weight in the above-described embodiments is about 0.3 mN in some instances. Further, the Gurley stiffness (MD) which is the example of the "plain paper" (basis weight: about 80 g/m$^2$) as the recording material of not less than 52 g/m$^2$ which is the threshold of the basis weight in the above-described embodiments is about 2 mN, and the Gurley stiffness (MD)

which is the example of the "thick paper" (basis weight: about 200 $g/m^2$) is about 20 mN in some instances.

In the above-described embodiments, description of the controller was made in which the controller acquires the information on the kind of the recording material on the basis of the input thereof from the operating portion or the external device through the operation by the operator, but the controller may also acquire the information on the kind of the recording material on the basis of the input of a detection result of the detecting means. For example, a basis weight sensor can be used as a basis weight detecting means for detecting an index value correlating with the basis weight of the recording material. As the basis weight sensor, for example, a basis weight sensor utilizing attenuation of ultrasonic wave has been known. This basis weight sensor includes an ultrasonic generating portion and an ultrasonic receiving portion which are provided so as to sandwich a recording material feeding passage. The basis weight sensor generates the ultrasonic wave from the ultrasonic generating portion and receives the ultrasonic wave attenuated by being passed through the recording material, and then on the basis of attenuation amount of the ultrasonic wave, detects the index value correlating with the basis weight of the recording material. Incidentally, the basis weight detecting means may only be required to be capable of detecting the index value correlating with the basis weight of the recording material and is not limited to the basis weight detecting means utilizing the ultrasonic wave, but may also be a basis weight detecting means utilizing light, for example. Further, the index value correlating the basis weight of the recording material is not limited to the basis weight itself, but may also be a thickness corresponding to the basis weight. Further, a surface property sensor can be used as a smoothness detecting means for detecting an index value correlating with surface smoothness of the recording material capable of being utilized for detecting the paper kind category. As the surface property sensor, a regularly/irregularly reflected light sensor for reading intensity of regularly reflected light and irregularly reflected light by irradiating the recording material with light has been known. In the case where the surface of the recording material is smooth, the regularly reflected light becomes strong, and in the case where the surface of the recording material is rough, the irregularly reflected light becomes strong. For that reason, the surface property sensor is capable of detecting the index value corresponding with the smoothness of the recording material surface by measuring a regularly reflected light quantity and an irregularly reflected light quantity. Incidentally, the smoothness detecting means may only be required to be capable of detecting the index value correlating with the smoothness of the recording material surface and is not limited to the above-described smoothness detecting means using the light quantity sensor, but may also be a smoothness detecting means using, for example, an image-pick up element. The index correlating the smoothness of the recording material surface is not limited to a value converted to a value in conformity with a predetermined standard such as Bekk smoothness, but may only be required to be a value having a correlation with the smoothness of the recording material surface. These detecting means can be disposed adjacent to the recording material feeding passage on a side upstream of the registration rollers with respect to the recording material feeding direction, for example. Further, for example, a detecting means (media sensor) constituted as a single unit including the above-described basis weight sensor, the surface property sensor, and the like can be used.

Further, in the above-described embodiments, as the offset mechanism and the contact-and-separation mechanism, an actuator for actuating the movable portion by the cam was used, but the mechanisms are not limited thereto. Each of the offset mechanism and the contact-and-separation mechanism may only be required to be capable of realizing an operation in conformity with each of the above-described embodiments, and for example, an actuator for actuating the movable portion by using a solenoid, for example, may be used.

Further, in the above-described embodiments, the constitution in which either of the inner roller or the outer roller is moved was described, but the offset amount may also be changed by moving both the inner roller and the outer roller.

Further, in the above-described embodiments, the case where the belt-shaped image bearing member was the intermediary transfer belt was described, but the present invention is applicable when an image bearing member constituted by an endless belt for feeding the toner image borne at the image forming position is used. As such a belt-shaped image bearing member, it is possible to cite a photosensitive (member) belt and an electrostatic recording dielectric (member) belt, in addition to the intermediary transfer belt in the above-described embodiments.

Further, the present invention can be carried out also in other embodiments in which a part or all of the constitutions of the above-described embodiments are replaced with alternative constitutions thereof. Accordingly, when the image forming apparatus using the belt-shaped image bearing member is used, the present invention can be carried out with no distinction as to tandem type/single drum type, a charging type, an electrostatic image forming type, a developing type, a transfer type and a fixing type. In the above-described embodiments, a principal part relating to the toner image formation/transfer was described principally, but the present invention can be carried out in various uses, such as a printers, various printing machines, copying machines, facsimile machines and multi-function machines, by adding necessary device, equipment and a casing structure.

INDUSTRIAL APPLICABILITY

According to the present invention, there is provided an image forming apparatus capable of improving the transfer property for each of the recording materials of the plurality of kinds in the mixed job while suppressing the lowering in productivity.

The present invention is not restricted to the foregoing embodiments, but can be variously changed and modified without departing from the spirit and the scope of the present invention. Accordingly, the following claims are attached hereto to make public the scope of the present invention.

This application claims the Conventional Priority from Japanese Patent Application 2020-008790 filed Jan. 22, 2020, all disclosure of which is incorporated by reference herein.

The invention claimed is:

1. An image forming apparatus comprising:

an image forming portion configured to form a toner image;

a rotatable intermediary transfer belt onto which the toner image formed by said image forming portion is transferred;

an inner roller contacting an inner peripheral surface of said intermediary transfer belt and configured to stretch said intermediary transfer belt;

a transfer unit contactable to an outer peripheral surface of said intermediary transfer belt and configured to form a transfer nip, where the toner image is transferred from said intermediary transfer belt onto a recording material, by nipping said intermediary transfer belt between said transfer unit and said inner roller, said transfer unit including an outer roller configured to form the transfer nip between said outer roller and said inner roller;

a contact and separation mechanism configured to bring said transfer unit into contact with and separation from said intermediary transfer belt;

a position changing mechanism configured to change a position of the transfer nip with respect to a circumferential direction of said inner roller by changing a position of said inner roller relative to said outer roller; and a controller configured to control said position changing mechanism and said contact and separation mechanism, wherein in a case that a mode, in which the position of said inner roller is changed by said position changing mechanism in a period after a trailing end of a preceding recording material reaches the transfer nip and before a leading edge of a recording material subsequent to the preceding recording material reaches the transfer nip during execution of a continuous image forming job for forming and outputting images on a plurality of recording materials is executed, in the period, said controller controls said position changing mechanism to change the position of said inner roller in a state in which said transfer unit contacts said intermediary transfer belt.

2. An image forming apparatus according to claim 1, wherein in a case that said image forming apparatus shifts from a stand-by state to a sleep state, when the position of said inner roller is changed to a predetermined position by said position changing mechanism, said controller controls said position changing mechanism so as to change the position of said inner roller to the predetermined position in a state in which said transfer unit and said intermediary transfer belt are separated from each other.

3. An image forming apparatus according to claim 1, further comprising a driving device configured to drive said intermediary transfer belt, wherein in a case that the mode is executed in the period, said controller controls said driving device so that drive of said intermediary transfer belt is continued during the period.

4. An image forming apparatus according to claim 1, wherein in a case that the mode is executed in the period, said controller controls said position changing mechanism so that the position of said inner roller is changed after a driving speed of said intermediary transfer belt in the period is changed from a first speed set for when the toner image is transferred onto the recording material to a second speed lower than the first speed.

5. An image forming apparatus according to claim 1, further comprising a driving device configured to drive said intermediary transfer belt, wherein in a case that the mode is executed in the period, said controller controls said driving device so that said intermediary transfer belt is driven at a driving speed set for when the toner image is transferred onto the recording material.

6. An image forming apparatus according to claim 1, further comprising an upstream roller provided adjacent to said inner roller and upstream of said inner roller with respect to a rotational direction of said intermediary transfer belt, said upstream roller configured to stretch said intermediary transfer belt while in contact with an inner surface of said intermediary transfer belt, and in a cross-section substantially perpendicular to a rotational axis direction of said inner roller, when a common tangential line between said inner roller and said upstream roller on a side where said intermediary transfer belt is stretched by said inner roller and said upstream roller is a reference line L1, a rectilinear line passing through a rotation center of said inner roller and substantially perpendicular to the reference line L1 is an inner roller center line L2, a rectilinear line passing through a rotation center of said outer roller and substantially perpendicular to the reference line L1 is an outer roller center line L3, and a distance between the inner roller center line L2 and the outer roller center line L3 is an offset amount X (provided that the offset amount X is a positive value when the outer roller center line L3 is positioned upstream of the inner roller center line L2 with respect to the rotational direction of said intermediary transfer belt), said position changing mechanism changes the offset amount X by changing the position of said inner roller.

7. An image forming apparatus according to claim 1, wherein said position changing mechanism is capable of changing the position of said inner roller to a first position where the position of the transfer nip corresponds to a first transfer position and to a second position where the position of the transfer nip corresponds to a second transfer position, and wherein, with respect to a rotational direction of said intermediary transfer belt, the first position is positioned upstream of the second position and downstream of a position where the toner image is transferred from said image forming portion onto said intermediary transfer belt, and said controller controls said position changing mechanism so that said inner roller is positioned in the first position in a case that a thickness of the recording material is greater than a predetermined amount and so that said inner roller is positioned in the second position in a case that the thickness of the recording material is equal to or less than the predetermined amount.

8. An image forming apparatus according to claim 1, wherein in a case that the mode is executed in the period, said controller controls an image forming operation so that formation of a latent image for the recording material subsequent to the preceding recording material is started after movement of said inner roller is completed.

9. An image forming apparatus according to claim 1, wherein in a case that the mode is executed in the period, said controller controls said contact and separation mechanism so as to separate said transfer unit from said intermediary transfer belt with an end of the job.

10. An image forming apparatus comprising:

an image bearing member configured to bear a toner image;

a transfer roller configured to form a transfer nip between said image bearing member and said transfer roller to transfer the toner image;

a first position changing mechanism configured to change a position of the transfer nip with respect to a rotational direction of said image bearing member;

a second position changing mechanism configured to change the position of said transfer roller between a first position where said transfer roller presses said image bearing member to form the transfer nip and a second position where said transfer roller does not press said image bearing member; and a controller configured to control said first position changing mechanism and said second position changing mechanism, wherein in a case that an operation, in which the position of said transfer nip with respect to the rotational direction of said image bearing member is changed in a period after a trailing edge of a first image area reaches the transfer nip and before a leading edge of a second image area subsequent to the first image reaches the transfer nip during execution of a continuous image forming job for forming and outputting images on a plurality of recording materials, is executed, in the period, said controller:

(i) controls said first position changing mechanism and said second position changing mechanism to change the position of the transfer nip with respect to the rotational direction of said image bearing member in a state in which said transfer roller presses said image bearing member, and then (ii) controls an image forming operation so that a formation of a latent image for the second image area is started after change of the position of the transfer nip is completed.

11. An image forming apparatus according to claim 10, wherein said controller controls said first position changing mechanism on the basis of the kind of the recording material.

12. An image forming apparatus according to claim 10, wherein said controller controls said second position changing mechanism so as to change the position of the transfer roller from the first position to the second position with an end of the job.

13. An image forming apparatus according to claim 10, wherein said controller controls said first position changing mechanism so as to change the position of the transfer nip to one of the first position and the second position on the basis of the kind of the recording material.

14. An image forming apparatus comprising:

an image bearing member configured to bear a toner image;

a transfer roller configured to form a transfer nip between said image bearing member and said transfer roller to transfer the toner image;

a position changing mechanism configured to change a position of said transfer roller so as to change a position of the transfer nip with respect to a rotational direction of said image bearing member, said position changing mechanism being configured to change the position of said transfer roller between a first position where said transfer roller presses said image bearing member to form the transfer nip and a second position where said transfer roller does not press said image bearing member; and a controller configured to control said position changing mechanism, wherein in a case that an operation, in which the position of the transfer nip with respect to the rotational direction of said image bearing member is changed in a period after a trailing edge of a first image area reaches the transfer nip and before a leading edge of a second image area subsequent to the first image area reaches the transfer nip during execution of a continuous image forming job for forming and outputting images on a plurality of recording materials, is executed, in the period, said controller:

(i) controls said position changing mechanism to change the position of the transfer nip with respect to the rotational direction of said image bearing member in a state in which said transfer roller presses said image bearing member, and then (ii) controls an image forming operation so that formation of a latent image for the second image area is started after change of the position of the transfer nip is completed.

15. An image forming apparatus according to claim 14, wherein in a case that the operation is executed in the period, said controller controls said position changing mechanism so as to change the position of said transfer roller from the first position to the second position with an end of the job.

16. An image forming apparatus according to claim 14, wherein said controller controls said position changing mechanism on the basis of the kind of the recording material.

17. An image forming apparatus according to claim 14, wherein said controller controls said position changing mechanism so as to change the position of the transfer nip to one of the first position and the second position on the basis of the kind of the recording material.

* * * * *